(12) United States Patent
Deguchi

(10) Patent No.: US 11,317,006 B2
(45) Date of Patent: Apr. 26, 2022

(54) INFORMATION PROCESSING APPARATUS, INFORMATION PROCESSING SYSTEM, AND NON-TRANSITORY COMPUTER READABLE MEDIUM

(71) Applicant: FUJIFILM Business Innovation Corp., Tokyo (JP)

(72) Inventor: Takuya Deguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/924,148

(22) Filed: Jul. 8, 2020

(65) Prior Publication Data

US 2021/0289104 A1    Sep. 16, 2021

(30) Foreign Application Priority Data

Mar. 16, 2020   (JP) .............................. JP2020-045761

(51) Int. Cl.
   *H04N 1/44*         (2006.01)
(52) U.S. Cl.
   CPC ......... *H04N 1/4433* (2013.01); *H04N 1/4426* (2013.01)
(58) Field of Classification Search
   CPC ...................... H04N 1/4433; H04N 1/4426
   See application file for complete search history.

(56) References Cited

U.S. PATENT DOCUMENTS

| | | | |
|---|---|---|---|
| 6,385,728 B1 * | 5/2002 | DeBry | G06F 21/608 |
| | | | 709/229 |
| 2003/0135755 A1 * | 7/2003 | Hahn | G06F 21/6218 |
| | | | 726/4 |

FOREIGN PATENT DOCUMENTS

JP          2017-184286          10/2017

* cited by examiner

*Primary Examiner* — King Y Poon
*Assistant Examiner* — Michael Burleson
(74) *Attorney, Agent, or Firm* — JCIPRNET

(57) ABSTRACT

An information processing apparatus includes a processor configured to: acquire first permission information indicative of an apparatus which a first user is permitted to use, permit the first user to use the information processing apparatus in a case where the first permission information indicates the information processing apparatus, and permit the first user to use the information processing apparatus in a case where the first permission information does not indicate the information processing apparatus and a second user having an attribute that is in a predetermined relationship with an attribute of the first user is permitted to use the information processing apparatus.

15 Claims, 23 Drawing Sheets

| TIME AND DATE | USER ID | APPARATUS ID | OCCUPATION | DEPARTMENT | LOCATION |
|---|---|---|---|---|---|
| ... | ... | ... | ... | ... | ... |
| ... | U02 | D12 | ... | ... | YMM |
| ... | U03 | D14 | ... | ... | EBI |
| ... | ... | ... | ... | ... | ... |

FIG. 16

| USER ID | OCCUPATION | DEPARTMENT | LOCATION |
|---|---|---|---|
| U01 | DEVELOPER | EDS | YMM |

~P11

| APPARATUS ID | APPARATUS NAME | EXPIRATION TIME AND DATE |
|---|---|---|
| D11 | ... | ... |
| D13 | ... | ... |
| ... | ... | ... |

~P12

SIGNATURE ~P13

```
<user>
 <id>U01</id>
  <occupation>developer</occupation>
 <department>EDS</department>
 <location>YMM</location>
</user>
```
~P11

```
<devices>
 <device>
  <model>ZYX-XII C5588</model>
  <serial>D11</serial>
  <expire>2019-08-21 18:59:25.307</expire>
 </device>
 <device>
  <model>ZYX-XII C7788</model>
  <serial>D13</serial>
  <expire>2020-04-07 08:46:25.847</expire>
 </device>
</devices>
```
~P12

```
<temporary>
 <device>
  <model>ZYX-VII C5588</model>
  <serial>D12</serial>
  <date>2019-12-19 18:21:13.486</date>
 </device>
 <signature>···</signature>
</temporary>
```

| USER ID | ATTRIBUTE INFORMATION | | |
|---|---|---|---|
| | OCCUPATION | DEPARTMENT | LOCATION |
| U01 | DEVELOPER | EDS | YMM |
| U02 | ... | ... | YMM |
| U03 | ... | ... | EBI |
| ... | ... | ... | ... |

| TIME AND DATE | USER ID | APPARATUS ID |
|---|---|---|
| ... | ... | ... |
| ... | U02 | D12 |
| ... | U03 | D14 |
| ... | ... | ... |

# INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-045761 filed Mar. 16, 2020.

BACKGROUND

(i) Technical Field

The present disclosure relates to an information processing apparatus, an information processing system, and a non-transitory computer readable medium.

(ii) Related Art

Japanese Unexamined Patent Application Publication No. 2017-184286 discloses a technique in which an image output apparatus displays a readable code pattern including permission information for permitting an unauthorized user to use the image output apparatus and an information processing apparatus outputs image data to the image output apparatus in a case where a read code pattern includes permission information.

SUMMARY

In a system in which apparatuses that are permitted to be used are registered in advance for each user, a user is not permitted to use an apparatus that is not registered for this user. However, for example, an administrator sometimes forgets to register a user, and in such a case, even a user who should be permitted to use an apparatus is not permitted to use the apparatus.

Although processing for temporarily permitting even an unauthorized user to use an apparatus is realized by using an operator (e.g., a "trial print" button) that accepts an operation made by any user in Japanese Unexamined Patent Application Publication No. 2017-184286, this configuration cannot select a user who should be given an authority from among unauthorized users. Meanwhile, in a case where a person similar to a user has been already permitted to use an apparatus, it is highly likely that this user should also be permitted to use the apparatus.

Aspects of non-limiting embodiments of the present disclosure relate to permitting even a user who is not permitted to use an information processing apparatus to use the information processing apparatus in a case where another user having an attribute that is in a predetermined relationship with an attribute of the user has been already permitted to use the information processing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: acquire first permission information indicative of an apparatus which a first user is permitted to use, permit the first user to use the information processing apparatus in a case where the first permission information indicates the information processing apparatus, and permit the first user to use the information processing apparatus in a case where the first permission information does not indicate the information processing apparatus and a second user having an attribute that is in a predetermined relationship with an attribute of the first user is permitted to use the information processing apparatus.

BRIEF DESCRIPTION OF THE DRAWINGS

An exemplary embodiment of the present disclosure will be described in detail based on the following figures, wherein:

FIG. 16 illustrates an example of first permission information issued by the server;

FIG. 17 illustrates a specific example of the first permission information;

FIGS. 30A and 30B illustrate an example of a database stored in a memory; and

DETAILED DESCRIPTION

Exemplary Embodiment

Configuration of Information Processing System

Figure 1:
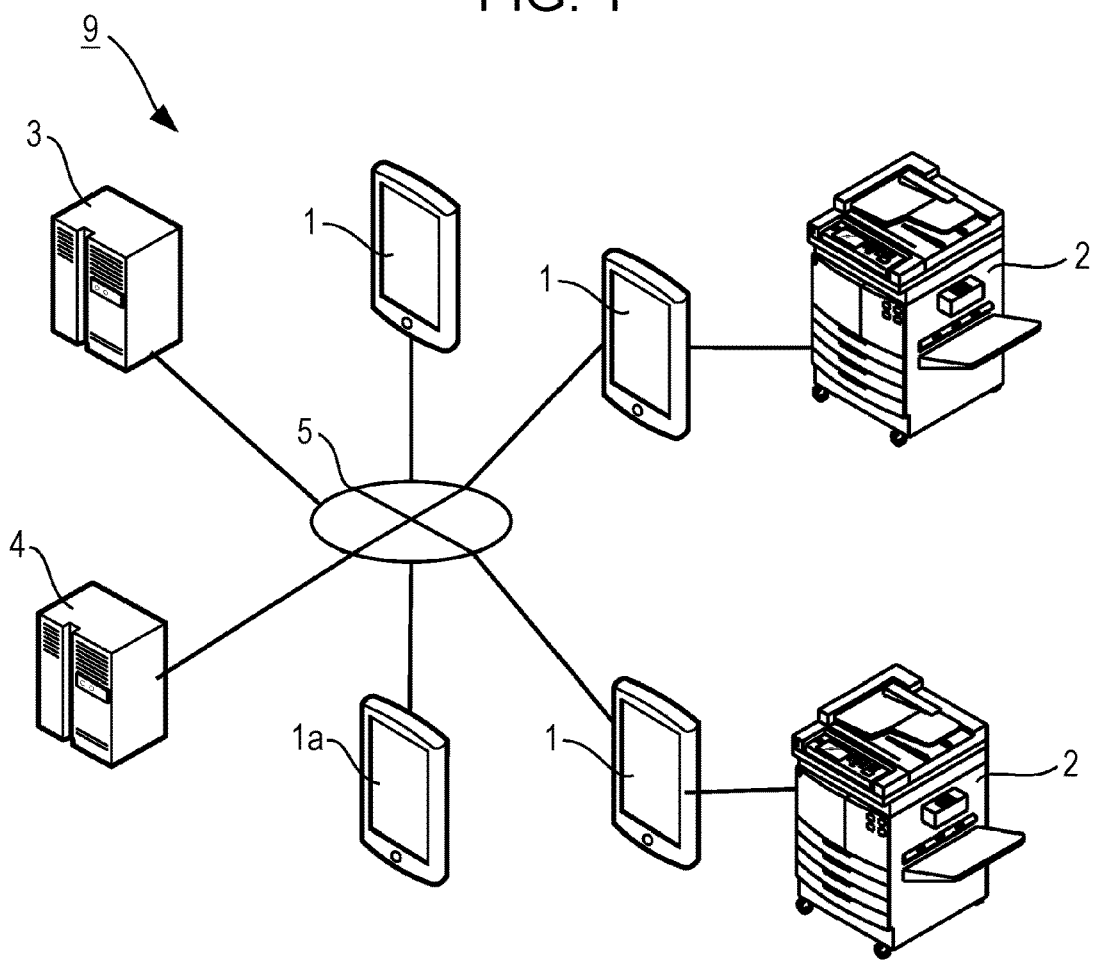
FIG. 1 illustrates an example of an overall configuration of an information processing system.

FIG. 1 illustrates an example of an overall configuration of an information processing system 9. The information processing system 9 illustrated in FIG. 1 is a system that authenticates a user, stores information on an information processing apparatus which the authenticated user is permitted to use, and issues permission information for a user who attempts to use an information processing apparatus. As illustrated in FIG. 1, the information processing system 9 includes terminals 1, information processing apparatuses 2, a server 3, a log server 4, and a communication line 5. Hereinafter, the terminals 1 are also referred to as first apparatuses, and the information processing apparatuses 2 are also referred to as second apparatuses.

Each of the terminals 1 is a terminal apparatus operated by a user of the information processing system 9 and is, for example, a smartphone or a personal computer such as a tablet PC. Each of the terminals 1 receives a user's operation and gives an instruction such as an instruction to ask for authentication of a user in the information processing system 9 or an instruction for using an information processing apparatus 2.

A terminal 1a illustrated in FIG. 1 is a terminal apparatus operated by an administrator (hereinafter referred to as a third user) who manages an information processing apparatus 2 although the terminal 1a has the same functions as the terminal 1.

Each of the information processing apparatuses 2 is an apparatus that allows a user who has been given permission to use a function thereof in accordance with an instruction given by the user on the terminal 1. Each of the information processing apparatuses 2 is, for example, an image processing apparatus that offers functions such as an image forming function of forming an image on a medium such as paper and an image reading function of optically reading a medium on which an image is formed to generate data (image data) of the image. Although an example in which the information processing apparatuses 2 are image processing apparatuses will be described in the exemplary embodiment below, the information processing apparatuses 2 in the information processing system 9 are not limited to image processing apparatuses.

Each of the terminals 1 and each of the information processing apparatuses 2 are connectable to each other when the terminal 1 and the information processing apparatus 2 are located within a range (referred to as a close range) closer than a predetermined range by a method that complies with a standard of Near Field Communication (NFC) such as ISO/IEC18092 (NFCIP-1), ISO/IEC14443, ISO/IEC15693, or IEEE802.15.

The server 3 is, for example, a computer. The server 3 is a server apparatus that authenticates a user of the information processing system 9 and offers information on an information processing apparatus which the user is permitted to use.

The log server 4 is, for example, a computer. In a case where a user permitted to use an information processing apparatus 2 actually uses the information processing apparatus 2 in the information processing system 9, a history of the use of the information processing apparatus 2 is stored in the log server 4.

The communication line 5 is a line that allows the terminals 1, the server 3, and the log server 4 to be communicably connected to one another. The communication line 5 may be, for example, a local area network (LAN), a wide area network (WAN), the Internet, or a combination thereof. The communication line 5 may also be, for example, a public switched telephone network (PSTN) or an integrated services digital network (ISDN).

Note that the number of terminals 1, the number of information processing apparatuses 2, the number of servers 3, the number of log servers 4, and the number of communication lines 5 in the information processing system 9 are not limited to those illustrated in FIG. 1. For example, the server 3 and the log server 4 each may be a cluster system in which plural apparatuses are in charge of respective functions.

Configuration of Server

Figure 2:
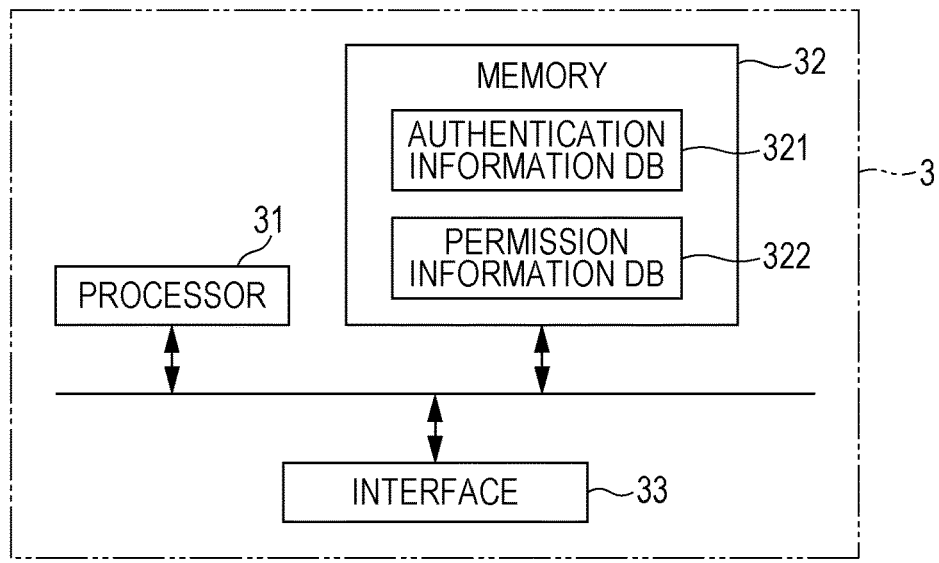
FIG. 2 illustrates an example of a configuration of a server.

FIG. 2 illustrates an example of a configuration of the server 3. The server 3 illustrated in FIG. 2 includes a processor 31, a memory 32, and an interface 33. These constituent elements are communicably connected to one another, for example, through a bus.

The processor 31 controls each unit of the server 3 by reading out programs stored in the memory 32 and executing the programs. The processor 31 is, for example, a central processing unit (CPU).

The interface 33 is a communication circuit that allows the server 3 to be communicably connected to the terminals 1 through the communication line 5, which is wired or wireless.

The memory 32 is a storage unit in which an operating system, various programs, data, and the like to be read by the processor 31 are stored. The memory 32 has a random access memory (RAM) and a read only memory (ROM). The memory 32 may have a solid state drive, a hard disk drive, or the like.

Furthermore, the memory 32 stores therein an authentication information DB 321 and a permission information DB 322.

Figure 3:
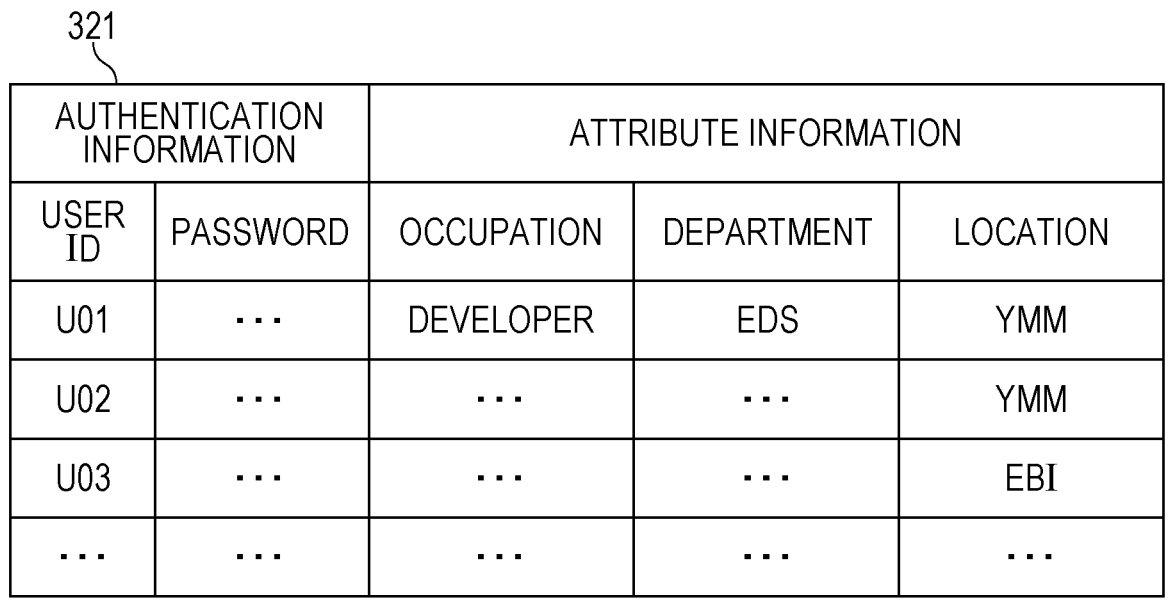
FIG. 3 illustrates an example of an authentication information DB.

FIG. 3 illustrates an example of the authentication information DB 321. The authentication information DB 321 illustrated in FIG. 3 is a database in which authentication information of users is stored. The authentication information DB 321 illustrated in FIG. 3 stores therein correspondences among a user ID, a password, an occupation, a department, and a location.

In the authentication information DB 321 illustrated in FIG. 3, the user ID is identification information for identifying a user of the information processing system 9. The password is, for example, a character string which only a user identified by a corresponding user ID knows. A combination of the user ID and the password is authentication information used for authentication of a user by the server 3.

In the authentication information DB 321 illustrated in FIG. 3, the occupation is a character string indicative of an occupation of a user identified by a corresponding user ID. The department is a character string indicative of a name of a department to which a user identified by a corresponding user ID belongs. The location is a character string indicative of a location in which a user identified by a corresponding user ID works. The occupation, department, and location are attribute information of a corresponding user.

Figure 4:
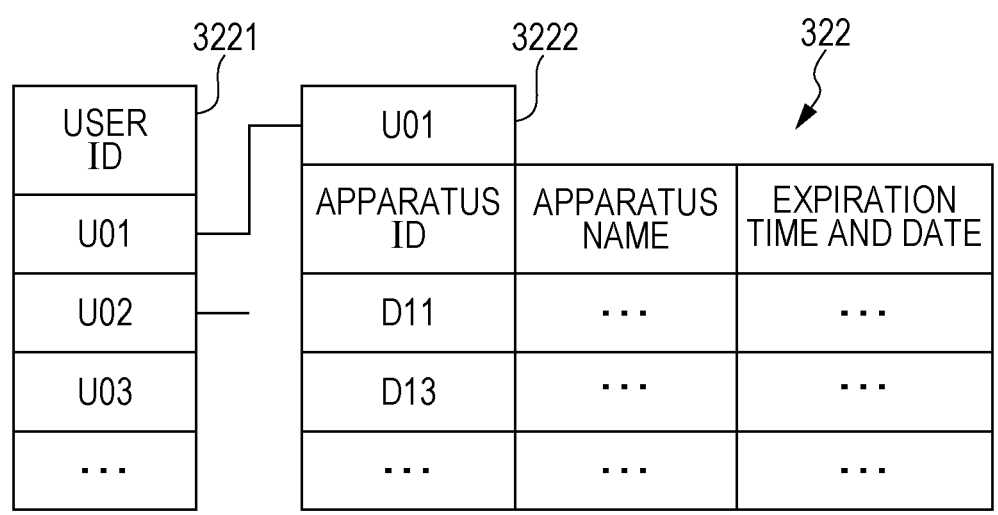
FIG. 4 illustrates an example of a permission information DB.

FIG. 4 illustrates an example of the permission information DB 322. The permission information DB 322 is a database that stores therein, for each user, information on an information processing apparatus 2 which the user is permitted to use. The permission information DB 322 illustrated in FIG. 4 has a user list 3221 and an apparatus list 3222.

The user list 3221 illustrated in FIG. 4 is a list of user IDs included in the authentication information DB 321. The apparatus list 3222 illustrated in FIG. 4 is prepared for each of the user IDs included in the user list 3221 and is a list of information on information processing apparatuses 2 which a user identified by the user ID is permitted to use.

In the apparatus list 3222, an apparatus ID is identification information for identifying an information processing apparatus 2 and is, for example, a production number or a serial number. The apparatus ID may be, for example, a Media Access Control (MAC) address or an Internet protocol (IP) address, provided that an information processing apparatus 2 can be identified by the apparatus ID in the information processing system 9.

In the apparatus list 3222, an apparatus name is a character string indicative of a name of an information processing apparatus 2 identified by a corresponding apparatus ID and is, for example, a product name or a brand name.

In the apparatus list 3222, expiration time and date are information indicative of time and date by which a user identified by a corresponding user ID can use an information processing apparatus 2 identified by a corresponding apparatus ID.

Configuration of Log Server

Figures 5, 6:
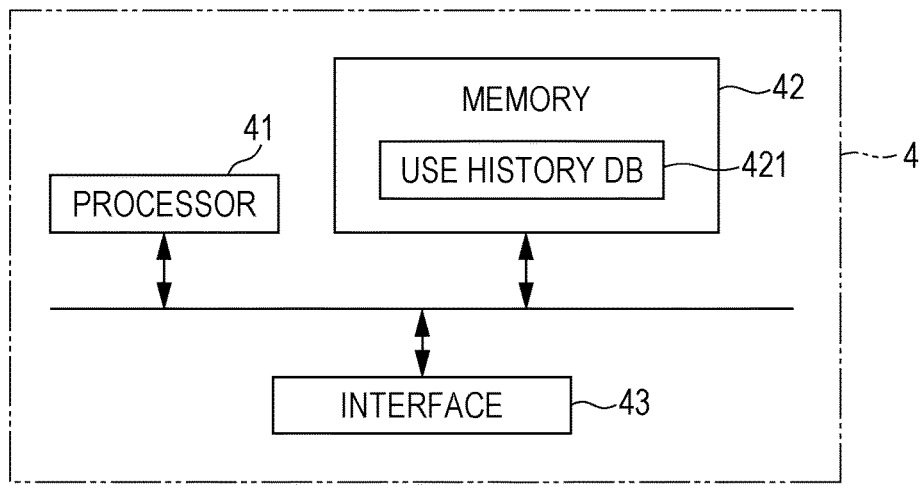
FIG. 5 illustrates an example of a configuration of a log server.
FIG. 6 illustrates an example of a use history DB.

FIG. 5 illustrates an example of a configuration of the log server 4. The log server 4 illustrated in FIG. 5 includes a processor 41, a memory 42, and an interface 43. These constituent elements are communicably connected to one another, for example, through a bus.

The processor 41 controls each unit of the log server 4 by reading out programs stored in the memory 42 and executing the programs. The processor 41 is, for example, a CPU.

The interface 43 is a communication circuit that allows the log server 4 to be communicably connected to the terminals 1 through the communication line 5, which is wired or wireless.

The memory 42 is a storage unit in which an operating system, various programs, data, and the like to be read by the processor 41 are stored. The memory 42 has a RAM and a ROM. The memory 42 may have a solid state drive, a hard disk drive, or the like. Furthermore, the memory 42 stores a use history DB 421 therein.

FIG. 6 illustrates an example of the use history DB 421. The use history DB 421 is a database in which a history (hereinafter also referred to as a use history) of use of an information processing apparatus 2 by a user is stored. The use history DB 421 illustrated in FIG. 6 stores therein correspondences among time and date, a user ID, an apparatus ID, an occupation, a department, and a location.

In the use history DB 421, the time and date are information indicative of time and date of use of an information processing apparatus 2.

In the use history DB 421, the user ID is identification information of a user who used an information processing apparatus 2 identified by a corresponding apparatus ID at corresponding time and date.

In the use history DB 421, the apparatus ID is identification information of an information processing apparatus 2 which a user identified by a corresponding user ID used at corresponding time and date.

In the use history DB 421, the occupation, department, and location are attribute information of a user identified by a corresponding user ID.

Configuration of Terminal

Figure 7:
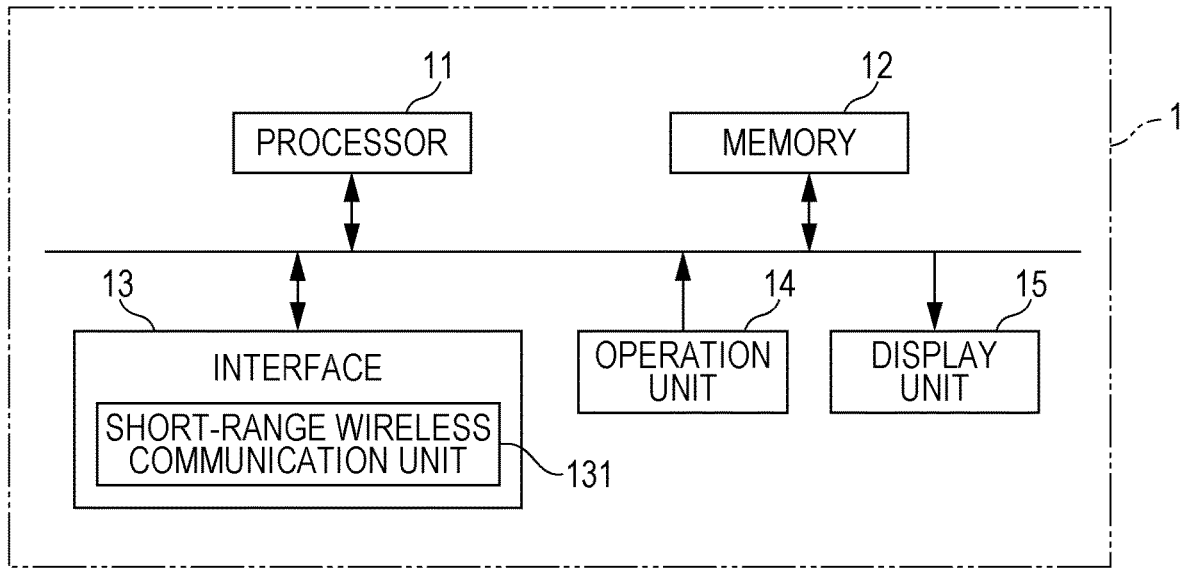
FIG. 7 illustrates an example of a configuration of a terminal.

FIG. 7 illustrates an example of a configuration of each of the terminals 1. The terminal 1 illustrated in FIG. 7 includes a processor 11, a memory 12, an interface 13, an operation unit 14, and a display unit 15. These constituent elements are communicably connected to one another, for example, through a bus.

The processor 11 controls each unit of the terminal 1 by reading out programs stored in the memory 12 and executing the programs. The processor 11 is, for example, a CPU.

The interface 13 is a communication circuit that allows the terminal 1 to be communicably connected to the server 3 and the log server 4 through the communication line 5, which is wired or wireless.

The interface 13 includes a short-range wireless communication unit 131. The short-range wireless communication unit 131 is communicably connected to an information processing apparatus 2 located within a close range by a method that is compliant with any of the short-range wireless communication standards described above.

The operation unit 14 includes an operator such as an operation button, a keyboard, a touch panel, or a mouse used to give various instructions. The operation unit 14 receives an operation and transmits a signal corresponding to the operation to the processor 11.

Furthermore, the operation unit 14 may have, for example, an imaging element that captures an image formed on a medium such as paper. In this case, the operation unit 14 extracts, from image data generated by the imaging element, a character, a pattern, or the like included in an image indicated by the image data and supplies code data obtained by encoding the character, the pattern, or the like to the processor 11. The operation unit 14 is, for example, a digital still camera or a bar code reader.

The display unit 15 has a display screen such as a liquid crystal display and displays an image under control of the processor 11. A transparent touch panel of the operation unit 14 may be superimposed on the display screen.

The memory 12 is a storage unit in which an operating system, various programs, date, and the like to be read by the processor 11 are stored. The memory 12 has a RAM and a ROM. The memory 12 may have a solid state drive, a hard disk drive, or the like.

Configuration of Information Processing Apparatus

Figure 8:
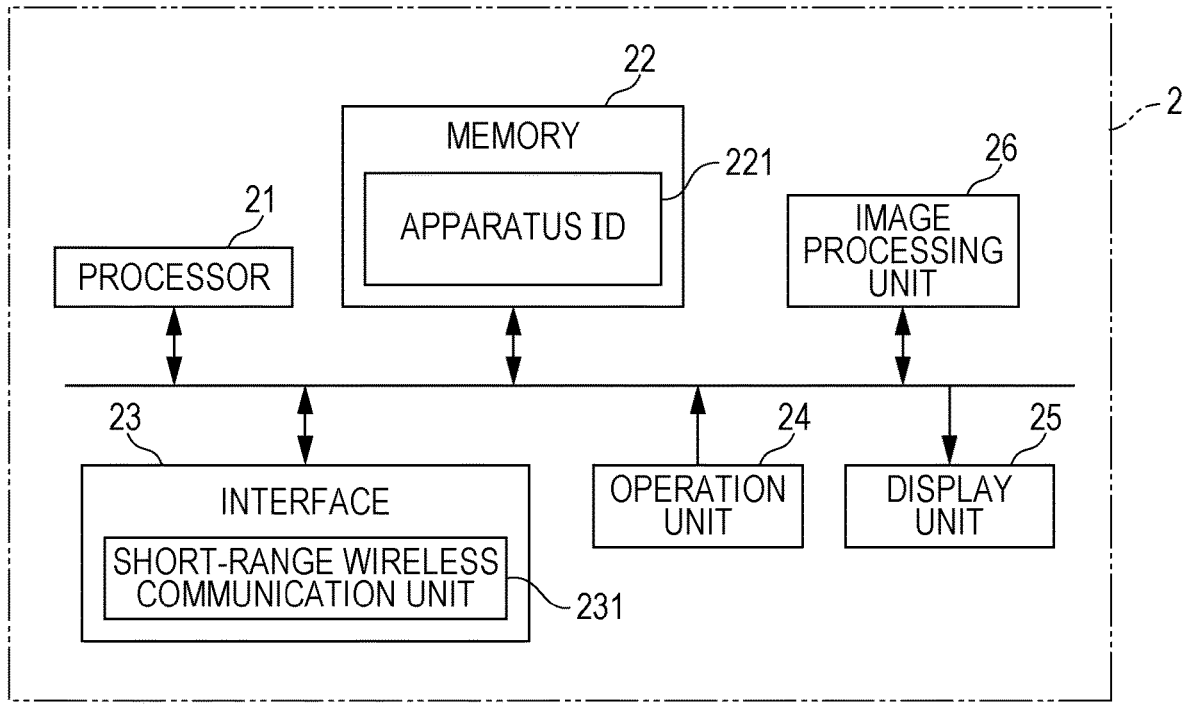
FIG. 8 illustrates an example of a configuration of an information processing apparatus.

FIG. 8 illustrates an example of a configuration of each of the information processing apparatuses 2. The information processing apparatus 2 illustrated in FIG. 8 includes a processor 21, a memory 22, an interface 23, an operation unit 24, a display unit 25, and an image processing unit 26. These constituent elements are communicably connected to one another, for example, through a bus.

The processor 21 controls each unit of the information processing apparatus 2 by reading out programs stored in the memory 22 and executing the programs. The processor 21 is, for example, a CPU.

The interface 23 has a short-range wireless communication unit 231. The short-range wireless communication unit 231 has the same configuration as the short-range wireless communication unit 131 and is communicably connected to the terminal 1 located within a close range by a method that is compliant with the short-range wireless communication standard employed by the terminals 1.

The operation unit 24 includes an operator such as an operation button, a keyboard, a touch panel, or a mouse used to give various instructions. The operation unit 24 receives an operation and transmits a signal corresponding to the operation to the processor 21.

Furthermore, the operation unit 24 may have, for example, an imaging element that captures an image formed on a medium such as paper. In this case, the operation unit 24 extracts, from image data generated by the imaging element, a character, a pattern, or the like included in an image indicated by the image data and supplies code data obtained by encoding the character, the pattern, or the like to the processor 21. The operation unit 24 is, for example, a digital still camera or a bar code reader.

The display unit 25 has a display screen such as a liquid crystal display and displays an image under control of the processor 21. A transparent touch panel of the operation unit 24 may be superimposed on the display screen.

Furthermore, the display unit 25 may have a light emission circuit that notifies a user about permission or prohibition of use of the information processing apparatus 2 by using a color of emitted light. This light emission circuit has, for example, two light emitting diodes that emit light of different colors.

The memory 22 is a storage unit in which an operating system, various programs, date, and the like to be read by the processor 21 are stored. The memory 22 has a RAM and a ROM. The memory 22 stores in the ROM, for example, an apparatus ID 221, which is identification information for identifying the information processing apparatus 2. The memory 22 may have a solid state drive, a hard disk drive, or the like.

The image processing unit 26 is an apparatus that executes various kinds of processing concerning an image. The image processing unit 26 offers functions such as an image forming function of forming an image on a medium such as paper by an electrophotographic system and an image reading function of optically reading a medium on which an image is formed and generating image data indicative of the image.

Functional Configuration of Server

Figure 9:
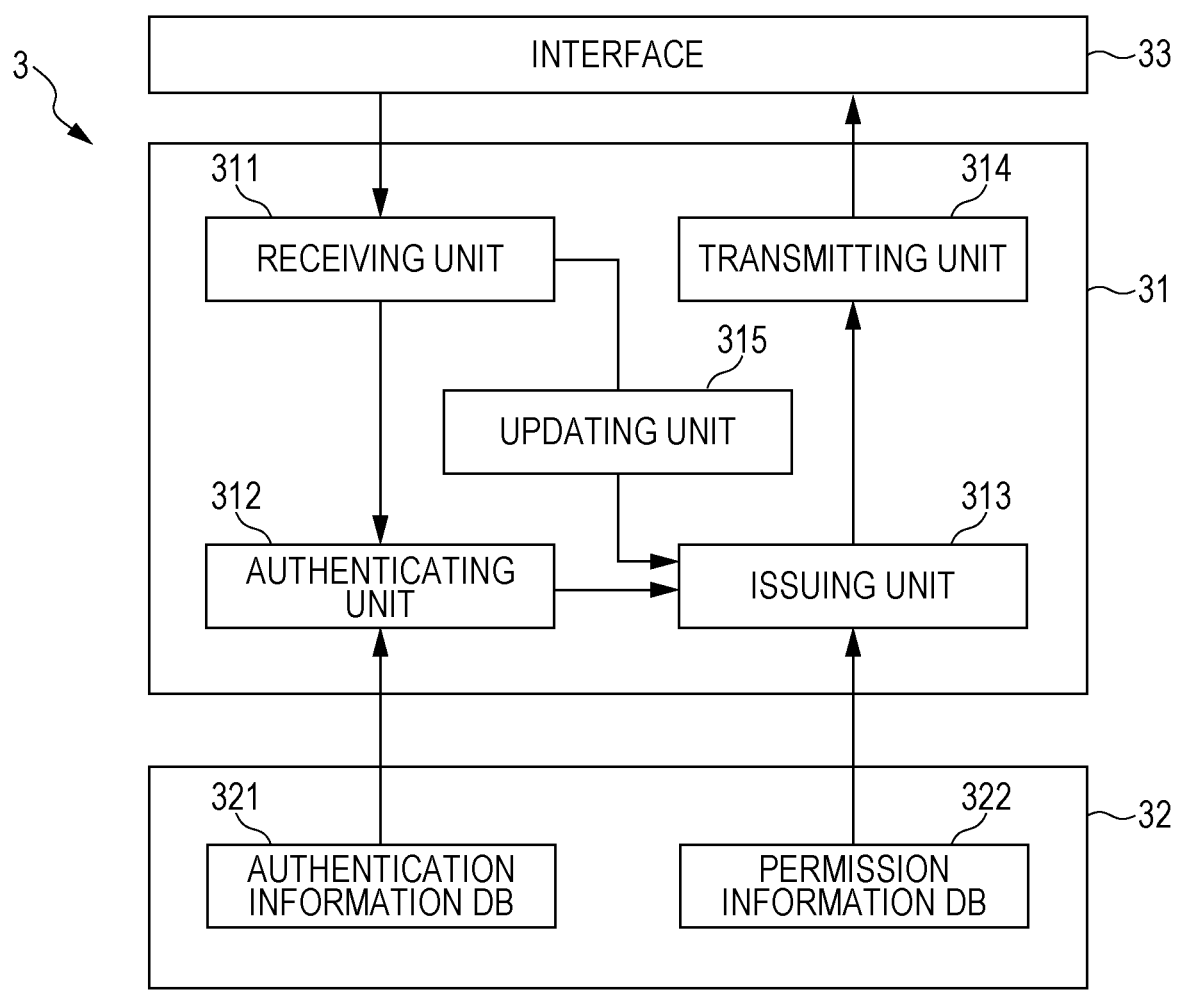
FIG. 9 illustrates an example of a functional configuration of the server.

FIG. 9 illustrates an example of a functional configuration of the server 3. The processor 31 of the server 3 functions as a receiving unit 311, an authenticating unit 312, an issuing unit 313, and a transmitting unit 314 by executing programs stored in the memory 32. Furthermore, the processor 31 illustrated in FIG. 9 also functions as an updating unit 315.

The receiving unit 311 receives authentication information from a terminal 1 (i.e., a first apparatus) through the communication line 5. The authenticating unit 312 attempts to authenticate a user (hereinafter also referred to as a first user) indicated by the authentication information received by the receiving unit 311 by comparing the authentication information with the authentication information DB 321.

In a case where the first user indicated by the authentication information is authenticated by the authenticating unit 312, the issuing unit 313 issues information (hereinafter referred to as first permission information) indicative of an information processing apparatus 2 which the first user is permitted to use among the plural information processing apparatuses 2 (i.e., second apparatuses) included in the information processing system 9 by referring to the permission information DB 322. The first permission information is, for example, information called a token or the like.

The transmitting unit 314 transmits the first permission information issued by the issuing unit 313 to the terminal 1 that has transmitted the authentication information received by the receiving unit 311.

That is, the server 3 that has the processor 31 functioning as the receiving unit 311, the authenticating unit 312, the issuing unit 313, and the transmitting unit 314 is an example of a server that, in a case where a first user is authenticated on the basis of authentication information, transmits, to a first apparatus, first permission information indicative of a second apparatus which the first user is permitted to use among the plural second apparatuses.

Furthermore, the receiving unit 311 illustrated in FIG. 9 receives, from a terminal 1, a request (hereinafter also referred to as an update request) made on the terminal 1 to update the permission information DB 322. The updating unit 315 illustrated in FIG. 9 updates the permission information DB 322 in response to the update request received by the receiving unit 311.

Functional Configuration of Log Server

Figure 10:
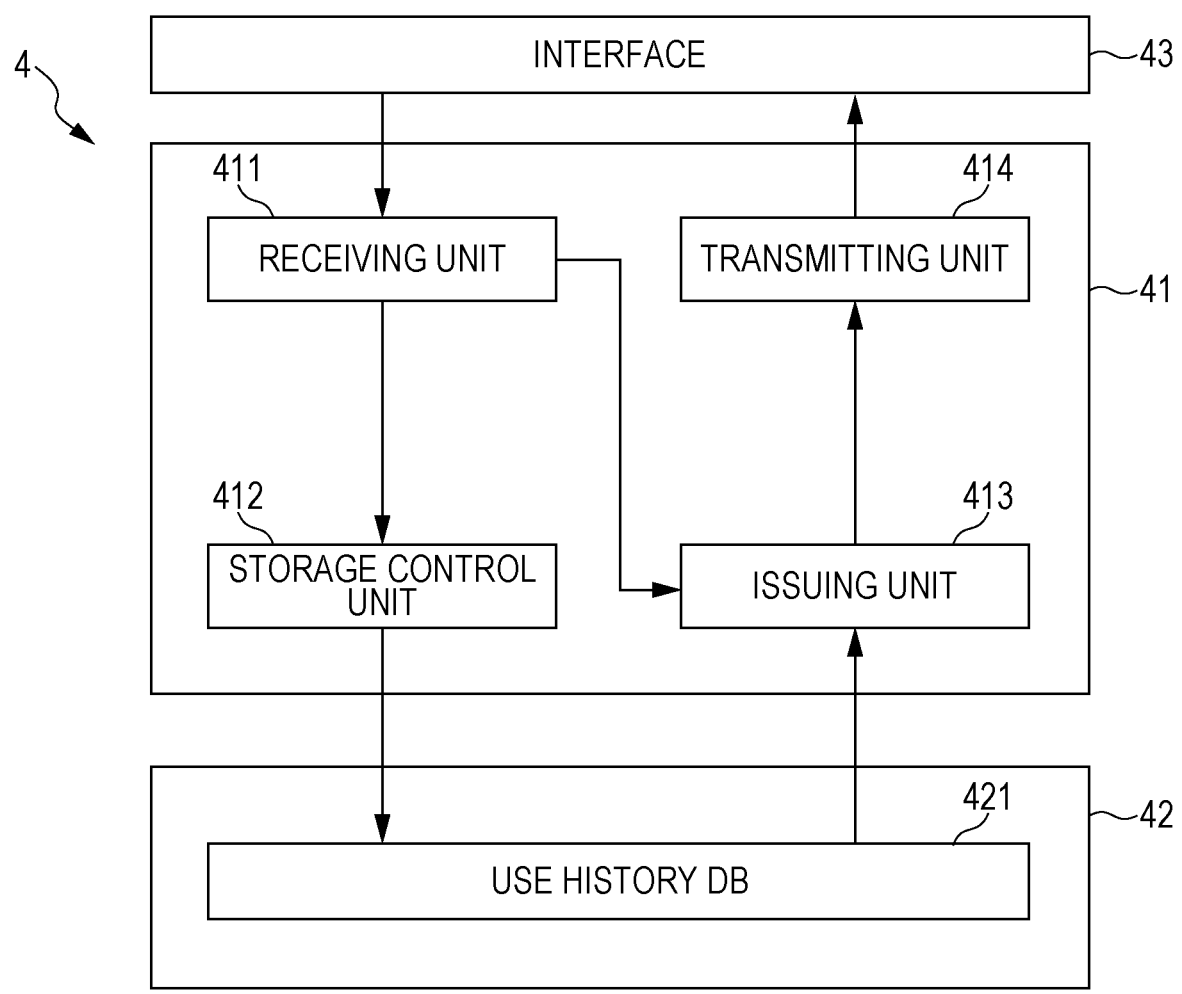
FIG. 10 illustrates an example of a functional configuration of the log server.

FIG. 10 illustrates an example of a functional configuration of the log server 4. The processor 41 of the log server 4 functions as a receiving unit 411, a storage control unit 412, an issuing unit 413, and a transmitting unit 414 by executing programs stored in the memory 32.

The receiving unit 411 receives an apparatus ID of an information processing apparatus 2 (i.e., a second apparatus) used in the information processing system 9, a user ID of a user who used the information processing apparatus 2, and time and date information indicative of time and date of the use from a terminal 1 operated by this user. Furthermore, the receiving unit 411 illustrated in FIG. 10 receives attribute information of the user identified by the received user ID.

The storage control unit 412 causes the apparatus ID, the user ID, and the time and date information received from the terminal 1 by the receiving unit 411 to be stored in the use history DB 421 of the memory 42. Furthermore, the storage control unit 412 illustrated in FIG. 10 causes the attribute information received in addition to the user ID by the receiving unit 411 to be stored in the use history DB 421 in association with the user ID.

That is, the log server 4 that includes the processor 41 functioning as the receiving unit 411 and the storage control unit 412 is an example of a log server that stores therein attribute information of a user permitted to use a second apparatus.

A user (i.e., a first user) who has been authenticated by the server 3 and acquired first permission information from the server 3 through a terminal 1 is prohibited from using an information processing apparatus 2 which the user requests to use in a case where an apparatus ID of the information processing apparatus 2 is not included in the first permission information. In this case, on the terminal 1, the first user sometimes inquires of the log server 4 whether or not a history indicating that another user (hereinafter also referred to as a second user) having an attribute that is in a predetermined relationship with an attribute of the first user used the information processing apparatus 2 which the first user is prohibited from using is stored in the log server 4. The receiving unit 411 receives this inquiry.

The issuing unit 413 searches for a history indicating that the designated second user used the designated information processing apparatus 2 by referring to the use history DB 421 when the receiving unit 411 receives the inquiry about whether or not a history indicating that the second user used the information processing apparatus 2 is stored. In a case where this history is found, the issuing unit 413 issues permission information (hereinafter referred to as second permission information) indicating that the second user is permitted to use the designated information processing apparatus 2.

The log server 4 illustrated in FIG. 10 causes a user ID of a user who used an information processing apparatus 2 and attribute information of the user identified by this user ID to be stored in the use history DB 421 as described above. In this case, the inquiry is equivalent to an inquiry about whether or not attribute information of the second user is stored in the use history DB 421. Accordingly, the issuing unit 413 illustrated in FIG. 10 issues the second permission information in a case where the receiving unit receives an inquiry about whether or not attribute information of a second user is stored and the attribute information of this second user is stored in the use history DB 421.

The transmitting unit 414 transmits the second permission information issued by the issuing unit 413 to the terminal 1 (i.e., the first apparatus) that transmitted the inquiry. That is, the log server 4 having the processor 41 functioning as the receiving unit 411, the issuing unit 413, and the transmitting unit 414 is an example of a log server that transmits, upon receipt of an inquiry about whether or not attribute information of a second user is stored, second permission information for a first user to a first apparatus in a case where the attribute information of the second user is stored. The "second permission information for the first user" is permission information indicating that a second user for the first user is permitted to use the information processing apparatus 2.

Functional Configuration of Terminal

Figure 11:
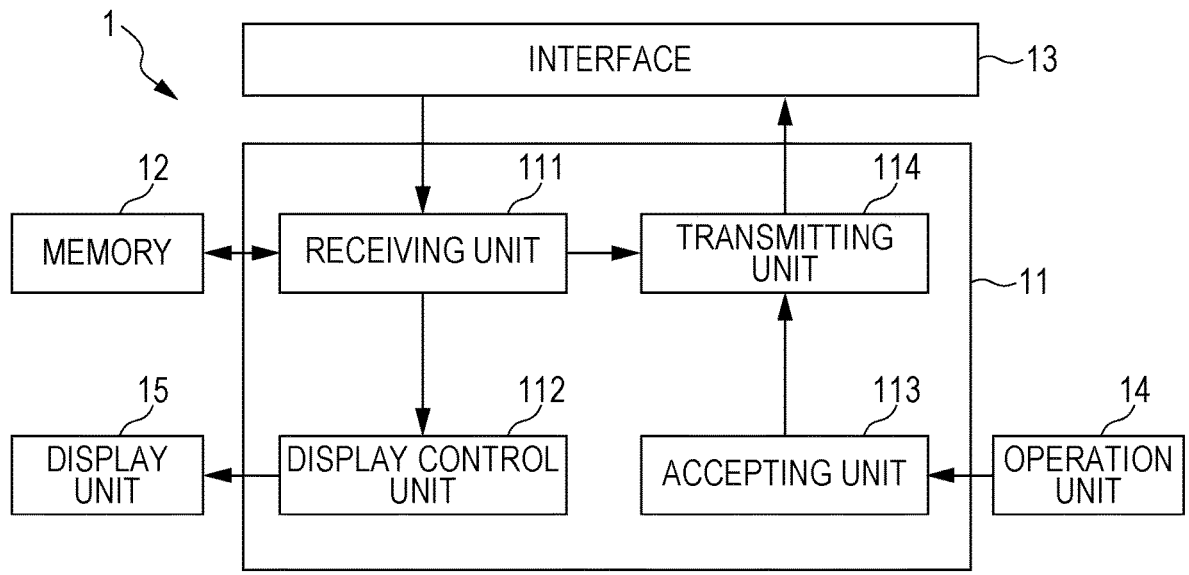
FIG. 11 illustrates an example of a functional configuration of the terminal.

FIG. 11 illustrates an example of a functional configuration of each of the terminals 1. The processor 11 of the terminal 1 functions as a receiving unit 111, a display control unit 12, an accepting unit 113, and a transmitting unit 114 by executing programs stored in the memory 12.

The receiving unit ill receives the first permission information from the server 3 and causes the first permission information to be stored in the memory 12. Furthermore, the receiving unit 111 receives the second permission information from the log server 4 and causes the second permission information to be stored in the memory 12.

Furthermore, the receiving unit 111 receives, from an information processing apparatus 2 communicably connected to the receiving unit 111 through short-range wireless communication, a notification (hereinafter referred to as a permission notification) indicative of permission of use, a notification (hereinafter referred to as a temporary permission notification) indicative of temporary permission of use, or a notification (hereinafter referred to as a prohibition notification) indicative of prohibition of use.

The display control unit 12 causes a screen corresponding to the first permission information, the second permission information, the permission notification, the temporary permission notification, or the prohibition notification received by the receiving unit 111 to be displayed on the display unit 15.

The accepting unit 113 receives authentication information of a user (i.e., a first user) through the operation unit 14. The transmitting unit 114 transmits the authentication information received by the accepting unit 113 to the server 3. That is, the terminal 1 having the processor 11 functioning as the accepting unit 113 and the transmitting unit 114 is an example of a first apparatus that receives authentication information of a first user and transmits the authentication information to the server.

Furthermore, upon receipt of the first permission information from the server 3 by the receiving unit 111, the transmitting unit 114 transmits the first permission information to any of the information processing apparatuses 2 located within a close range. This information processing apparatus 2 is any of the plural information processing apparatuses 2 that constitute the information processing system 9. That is, the terminal 1 having the processor 11 functioning as the receiving unit 111 and the transmitting unit 114 is an example of a first apparatus that transmits first permission information to any of the plural second apparatuses.

Furthermore, upon receipt of the second permission information from the log server 4 by the receiving unit 111, the transmitting unit 114 transmits the second permission information to an information processing apparatus 2 designated by the second permission information. The information processing apparatus 2 that has received the second permission information from the terminal 1 transmits a temporary permission notification to this terminal 1. This temporarily permits a first user operating the terminal 1 to use the information processing apparatus 2.

In a case where the first user thinks that he or she should be not temporarily but constantly permitted to use the information processing apparatus 2, the first user causes the terminal 1 to transmit an update request by operating the operation unit 14. This update request is a request requesting the server 3 to update the permission information DB 322 so that the information processing apparatus 2 is added as an information processing apparatus 2 which the first user is permitted to use. The accepting unit 113 receives this update request. The transmitting unit 114 transmits the update request received by the accepting unit 113 to the server 3.

The server 3 that has received the update request from the terminal 1 causes an apparatus ID of the information processing apparatus 2 indicated by the second permission information received by the terminal 1 to be stored in the permission information DB 322 in association with a user ID of the first user operating the terminal 1. In this way, the first permission information issued with reference to the permission information DB 322 is updated.

Note that the update request need not be received by the accepting unit 113 from a user through the operation unit 14. For example, the transmitting unit 114 may transmit the update request to the server 3 in a case where the receiving unit 111 receives second permission information from the log server 4. That is, the terminal 1 having the processor 11 functioning as the receiving unit 111 and the transmitting unit 114 is an example of a first apparatus that request the server to update first permission information upon receipt of second permission information from the log server.

Functional Configuration of Information Processing Apparatus

Figure 12:
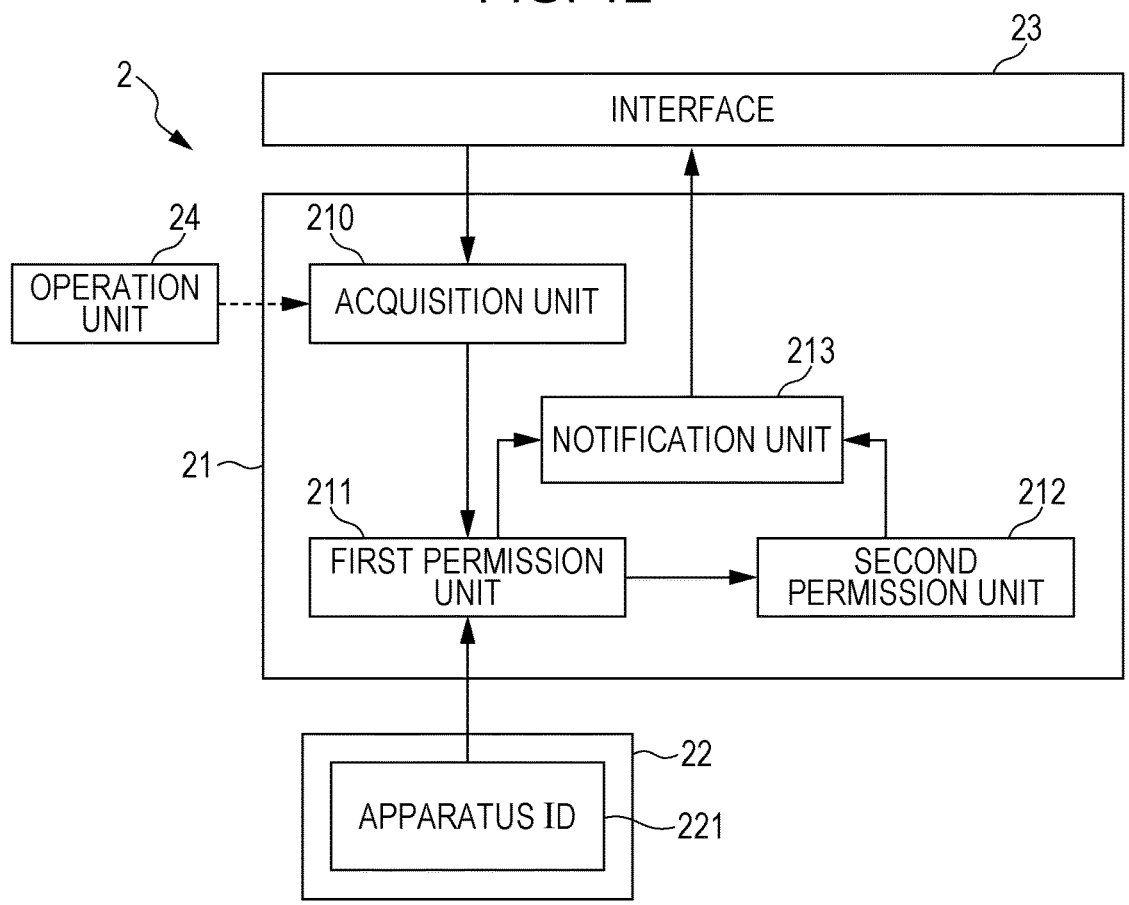
FIG. 12 illustrates an example of a functional configuration of the information processing apparatus.

FIG. 12 illustrates an example of a functional configuration of each of the information processing apparatuses 2. The processor 21 of the information processing apparatus 2 functions as an acquisition unit 210, a first permission unit 211, a second permission unit 212, and a notification unit 213 by executing programs stored in the memory 22.

The acquisition unit 210 acquires first permission information from a terminal 1 connected through short-range wireless communication. The first permission information is information including an apparatus ID indicative of an apparatus which the first user is permitted to use. That is, the processor 21 functioning as the acquisition unit 210 is an example of a processor that acquires first permission information from a terminal operated by a first user.

Furthermore, the acquisition unit 210 acquires second permission information from a terminal 1 connected through short-range wireless communication. This second permission information is information indicating that a second user having an attribute that is in a predetermined relationship with an attribute of the first user operating the terminal 1 is permitted to use an information processing apparatus 2 designated by an inquiry, as described above.

Note that the information processing apparatus 2 may acquire first permission information from the first user through the operation unit 24. For example, the first user causes an image obtained by encoding first permission information acquired from the server 3 to be displayed on the display unit 15 of the terminal 1 operated by the first user and brings the image close to a digital camera or a bar code reader included in the operation unit 24 of the information processing apparatus 2 which the first user requests to use. This image is, for example, a character string, a one-dimensional code, or a two-dimensional code.

The operation unit 24 reads the image displayed on the terminal 1, generates image data indicative of the image, and supplies the image data to the processor 21. The acquisition unit 210 realized by the processor 21 need just acquire first permission information by analyzing and converting the image data supplied from the operation unit 24. That is, the processor 21 functioning as the acquisition unit 210 is an example of a processor that acquires first permission information indicative of an apparatus which a first user is permitted to use.

The first permission unit 211 determines whether or not the first permission information includes an apparatus ID of this information processing apparatus 2 by comparing the apparatus ID 221 stored in the memory 22 with the apparatus ID included in the first permission information acquired by the acquisition unit 210. In a case where it is determined that the first permission information includes the apparatus ID of this information processing apparatus 2, the first permission unit 211 permits the first user operating the terminal 1 to use this information processing apparatus 2. That is, the processor 21 functioning as the first permission unit 211 is an example of a processor that permits a first user to use this information processing apparatus 2 in a case where first permission information indicates this information processing apparatus 2.

Meanwhile, in a case where it is determined that the first permission information does not include the apparatus ID of this information processing apparatus 2, the first permission unit 211 prohibits the first user operating the terminal 1 from using this information processing apparatus 2.

The second permission unit 212 permits the first user to use this information processing apparatus 2 in a case where a second user having an attribute that is in a predetermined relationship with an attribute of the first user who has been prohibited from using this information processing apparatus 2 by the first permission unit 211 is permitted to use this information processing apparatus 2.

For example, in a case where the acquisition unit 210 receives second permission information, the first permission unit 211 illustrated in FIG. 12 supplies the second permission information to the second permission unit 212. In a case where the supplied second permission information indicates that the second user is permitted to use this information processing apparatus 2, the second permission unit 212 issues a temporary permission notification indicative of temporary permission for the first user to use this information processing apparatus 2 and causes the notification unit 213 to transmit the temporary permission notification to the terminal 1.

That is, the processor 21 functioning as the second permission unit 212 is an example of a processor that permits a first user to use this information processing apparatus 2 in a case where first permission information does not indicate this information processing apparatus 2 and a second user having an attribute that is in a predetermined relationship with an attribute of the first user is permitted to use this information processing apparatus 2.

The notification unit 213 notifies the terminal 1 about permission or prohibition of use of this information processing apparatus 2 in a case where the first permission unit 211 permits or prohibits use of this information processing apparatus 2. That is, the processor 21 functioning as the first permission unit 211 and the notification unit 213 is an example of a processor that notifies a terminal about permission for a first user to use this information processing apparatus 2 in a case where first permission information indicates this information processing apparatus 2. Furthermore, the processor 21 functioning as the first permission unit 211 and the notification unit 213 is an example of a processor that notifies a terminal about prohibition of use of this information processing apparatus 2 by a first user in a case where first permission information does not indicate this information processing apparatus 2.

Furthermore, in a case where the second permission unit 212 permits use of this information processing apparatus 2, the notification unit 213 notifies the terminal 1 about the permission. That is, the processor 21 functioning as the acquisition unit 210, the second permission unit 212, and the notification unit 213 is an example of a processor that notifies a terminal about permission of use in a case where second permission information indicating that a second user is permitted to use this information processing apparatus 2 is received from the terminal that has been notified about prohibition of use.

The information processing apparatus 2 that has the processor 21 functioning as the first permission unit 211 and the second permission unit 212 is an example of a second apparatus that permits a first user to use this information processing apparatus 2 in a case where transmitted first permission information indicates this information processing apparatus 2 and permits the first user to use this information processing apparatus 2 in a case where the first permission information does not indicate this information processing apparatus 2 and a second user having an attribute that is in a predetermined relationship with an attribute of the first user is permitted to use this information processing apparatus 2.

The information processing apparatus 2 that has the processor 21 functioning as the first permission unit 211 and the second permission unit 212 is an example of a second apparatus that permits a first user to use this apparatus in a case where second permission information is received from the first apparatus.

Note that a function (hereinafter referred to as a second function) of the information processing apparatus 2 permitted by the second permission information may be restricted more than a function (hereinafter referred to as a first function) of the information processing apparatus 2 permitted by the first permission information. In this case, the processor 21 of the information processing apparatus 2 is an example of a processor that permits a first user to use a first function of this information processing apparatus 2 in a case where acquired first permission information indicative of an apparatus that permits the first user to use the first function thereof indicates this information processing apparatus 2 and permits the first user to use a second function of this information processing apparatus 2 that is restricted more than the first function in a case where the first permission information does not indicate this information processing apparatus 2 and a second user is permitted to use the first function of this information processing apparatus 2.

Furthermore, a period for which the second function is permitted by the second permission information may be restricted more than a period for which the first function is permitted by the first permission information. For example, as described above, the period for which the second function is permitted by the second permission information may be temporary, that is, shorter than the period for which the first function is permitted by the first permission information.

Operation of Information Processing System

A flow of exchange of information among the terminal 1, the information processing apparatus 2, the server 3, and the log server 4 in the information processing system 9 is described with reference to a sequence diagram.

Transmission of Permission Notification

Figure 13:
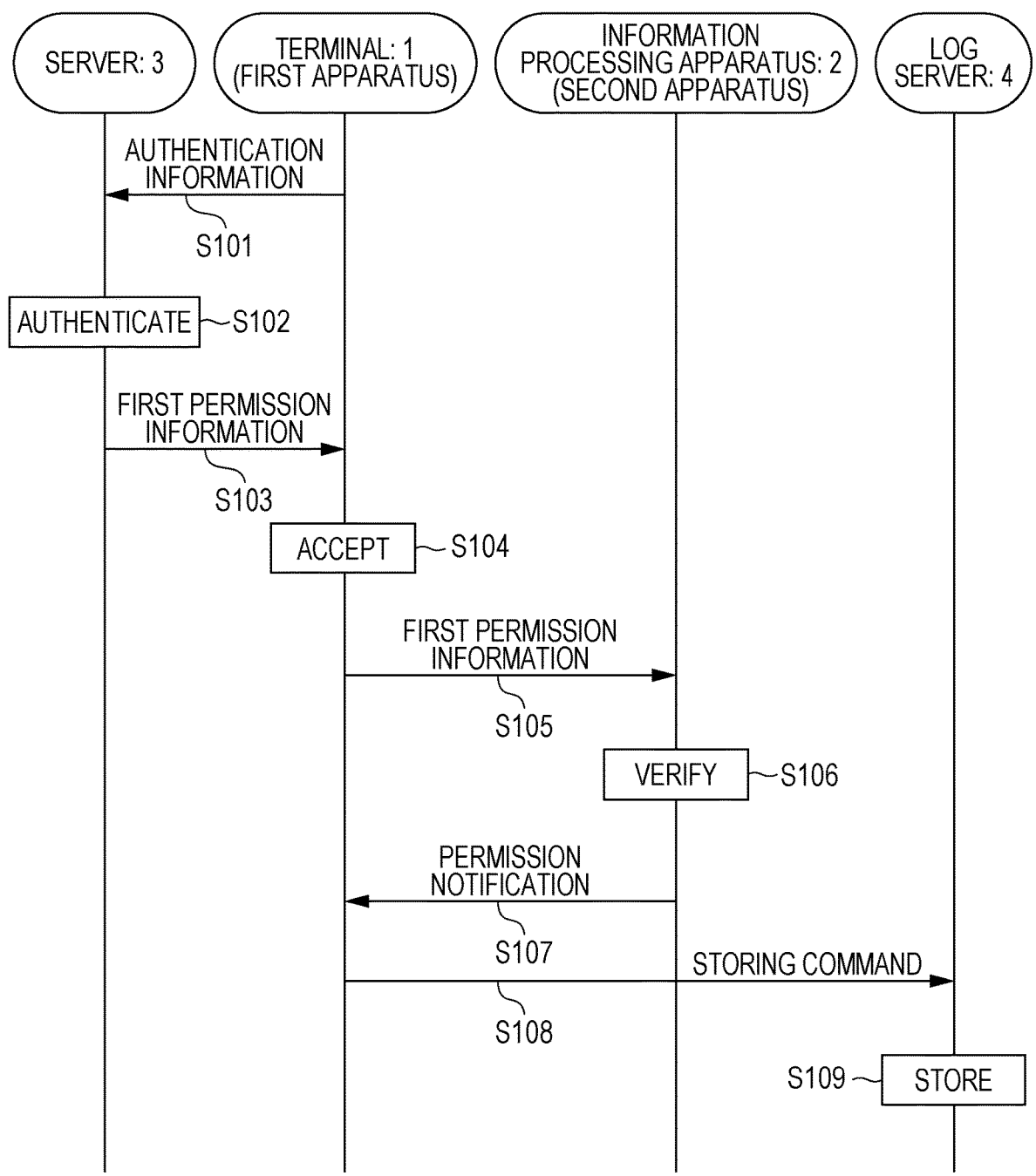
FIG. 13 is a sequence diagram illustrating an example of flow of transmission of a permission notification by the information processing apparatus.

FIG. 13 is a sequence diagram illustrating an example of flow of transmission of a permission notification by an information processing apparatus 2. A first user who operates a terminal 1 enters his or her authentication information on the terminal 1. This authentication information may be biological information such as a fingerprint, a vein pattern, or an iris. In this example, the authentication information is a combination of user ID and password.

Figure 14:
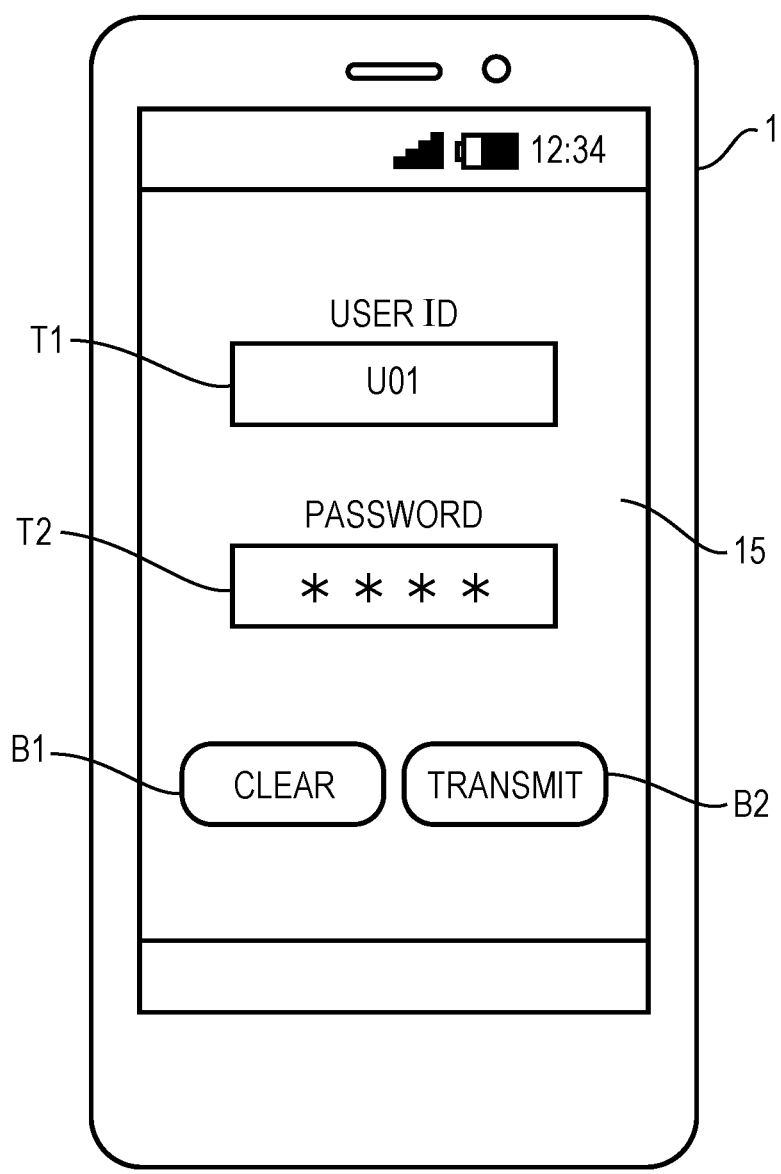
FIG. 14 illustrates an example of the terminal that accepts entry of authentication information.

FIG. 14 illustrates an example of the terminal 1 that receives the authentication information. When the first user activates a program for using the information processing system 9, the terminal 1 causes a login screen illustrated in FIG. 14 to be displayed on the display unit 15. The login screen has a text box T1, a text box T2, a button B1, and a button B2.

The text box T1 is disposed below a character string "USER ID" and accepts entry of a character string indicative of a user ID of the first user. The text box T2 is disposed below a character string "PASSWORD" and accepts entry of a character string indicative of a password which only the first user knows.

The button B1 has a character string "CLEAR". When this button B1 is clicked, the processor 11 of the terminal 1 initializes the states of the text box T1 and the text box T2 by deleting entry in the text box T1 and the text box T2.

The button B2 has a character string "TRANSMIT". When this button B2 is clicked, the processor 11 transmits the entered authentication information to the server 3.

As illustrated in FIG. 13, the terminal 1 transmits the authentication information entered by the first user to the server 3 (step S101). Upon receipt of the authentication information from the terminal 1, the server 3 attempts to authenticate the first user on the basis of the authentication information (step S102). In a case where this authentication succeeds, the server 3 issues first permission information indicating an apparatus ID of an information processing apparatus 2 which the first user is permitted to use and transmits the first permission information to the terminal 1 (step S103). Meanwhile, in a case where this authentication fails, the server 3 notifies the first user about failure of the authentication on the terminal 1 (not illustrated in FIG. 13).

Figure 15A:
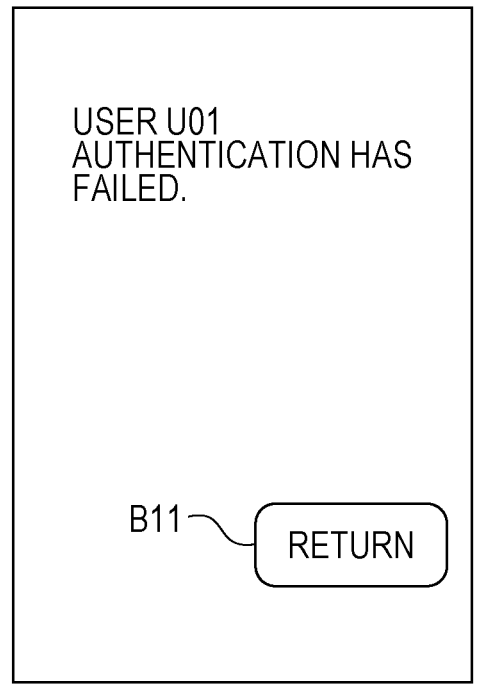
FIGS. 15A and 15B illustrate an example of display on the terminal.
Figure 15B:
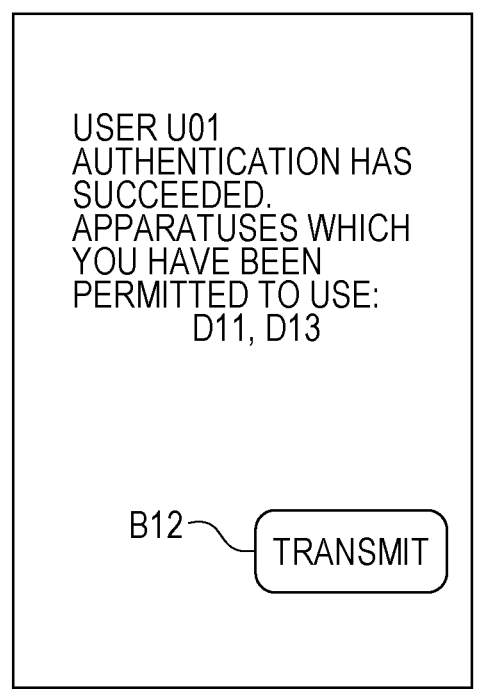

FIGS. 15A and 15B illustrate an example of display on the terminal 1. In a case where the authentication of the first user fails, the server 3 gives the terminal 1 an instruction to display, for example, a screen illustrated in FIG. 15A. The first user knows that the authentication has failed from a message "AUTHENTICATION HAS FAILED" illustrated in FIG. 15A. Then, the first user clicks a button B11 having a character string "RETURN" illustrated in FIG. 15A. As a result, the login screen is displayed again on the terminal 1.

In a case where the authentication of the first user succeeds, the server 3 issues first permission information, transmits the first permission information to the terminal 1, and causes, for example, a screen illustrated in FIG. 15B to be displayed on the terminal 1. The first user knows that he or she has been successfully authenticated from a message "AUTHENTICATION HAS SUCCEEDED" illustrated in FIG. 15B. Furthermore, the first user knows that apparatus IDs of information processing apparatuses 2 which he or she has been permitted to use are "D11" and "D13" from a message "APPARATUSES WHICH YOU HAVE BEEN PERMITTED TO USE: D11, D13" illustrated in FIG. 15B.

As illustrated in FIG. 13, upon receipt of the first permission information issued by the server 3, the terminal 1 shifts to a state for accepting an instruction to transmit the first permission information to an information processing apparatus 2 (step S104). A screen for accepting this instruction is, for example, a screen illustrated in FIG. 15B. When the first user moves to a position in front of an information processing apparatus 2 which the first user wants to use and clicks a button B12 having a character string "TRANSMIT" illustrated in FIG. 15B, the terminal 1 transmits the first permission information to the information processing apparatus 2 in front of the first user (step S105).

Upon receipt of the first permission information from the terminal 1, the information processing apparatus 2 verifies whether or not the first user is permitted to use this information processing apparatus 2 (step S106). In this verification step, the processor 21 of the information processing apparatus 2 illustrated in FIG. 8 determines whether or not the received first permission information includes an apparatus ID of this information processing apparatus 2 by referring to the apparatus ID 221 stored in the memory 22.

FIG. 16 illustrates an example of the first permission information issued by the server 3. The first permission information P1 illustrated in FIG. 16 is first permission information issued by the server 3 and has first user information P11 and second apparatus information P12. The first user information P11 is information on the first user authenticated by the server 3 and information on a user ID, an occupation, a department, and a location of the first user. The second apparatus information P12 is information on the information processing apparatus 2 (i.e., second apparatus) which the first user is permitted to use and is information on an apparatus ID, an apparatus name, and expiration time and date of this information processing apparatus 2.

As illustrated in FIG. 16, the first permission information P1 may include a signature P13 of the server 3. For example, this signature P13 is generated by a secret key unique to the server 3 and can be verified by a public key corresponding to this secret key. The signature P13 may be generated by a shared key shared by the server 3 and the information processing apparatus 2. In a case where the first permission information P1 includes the signature P13, the information processing apparatus 2 can verify that the first permission information P1 is legitimate first permission information issued by the server 3.

FIG. 17 illustrates a specific example of the first permission information. As illustrated in FIG. 17, the first permission information P1 is written, for example, in Extensible Markup Language (XML). In this case, for example, the user ID is expressed by a start tag and an end tag of an element name "id", and contents of the user ID are written between the start tag and the end tag.

For example, in a case where the information processing apparatus 2 receives the first permission information P1 illustrated in FIG. 17 from the terminal 1, the information processing apparatus 2 parses the first permission information P1 to create a list of apparatus IDs of information processing apparatuses 2 which the first user is permitted to use. Then, the information processing apparatus 2 determines whether or not the generated list includes an apparatus ID indicative of this information processing apparatus 2.

In the example illustrated in FIG. 13, the information processing apparatus 2 succeeds in the verification. That is, the information processing apparatus 2 determines that the first user is permitted to use this information processing apparatus 2 and transmits a permission notification indicating that the first user is permitted to use this information processing apparatus 2 to the terminal 1 (step S107). The terminal 1 that has received the permission notification gives the log server 4 a command (storing command) to store information indicating that the first user has used the information processing apparatus 2 on the basis of the first permission information through the communication line 5 (step S108).

Upon receipt of this storing command, the log server 4 stores therein at least the user ID of the first user and the apparatus ID of the information processing apparatus 2 which the first user used on the basis of the first permission information.

In this example, the terminal 1 gives the storing command including the attribute information of the first user to the log server 4, for example, by transmitting the first permission information. The log server 4 that has received the storing command including the attribute information stores therein not only the user ID and the apparatus ID, but also time and date of use of the information processing apparatus 2 by the first user and the attribute information (e.g., an occupation, a department, and location) of the first user (step S109).

Transmission of Prohibition Notification

Figure 18:
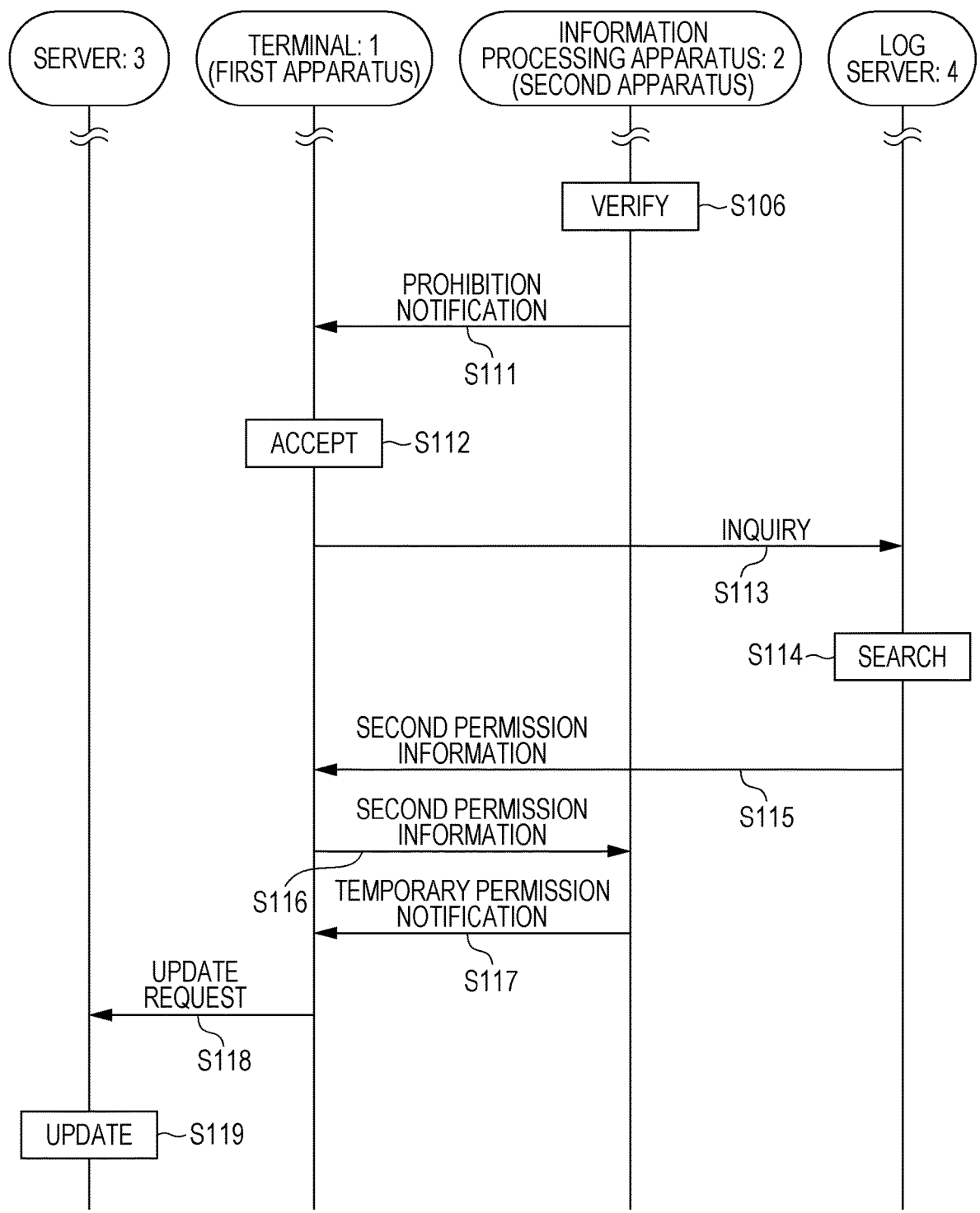
FIG. 18 is a sequence diagram illustrating an example of flow of transmission of a temporary permission notification by the information processing apparatus.

FIG. 18 is a sequence diagram illustrating an example of flow of transmission of a temporary permission notification by an information processing apparatus 2. The operation illustrated in FIG. 18 includes the steps to step S106 illustrated in FIG. 13.

In the example illustrated in FIG. 18, the information processing apparatus 2 fails in the verification. That is, the first permission information received from the terminal 1 by the information processing apparatus 2 does not include the apparatus ID of this information processing apparatus 2.

Accordingly, the information processing apparatus 2 determines that the first user is prohibited from using this information processing apparatus 2 (i.e., the first user is not permitted to use this information processing apparatus 2) and transmits a prohibition notification indicating that the first user is prohibited from using this information processing apparatus 2 to the terminal 1 (step S111).

The terminal 1 that has received the prohibition notification shifts to a state for accepting an instruction from the first user to inquire a use history of a second user from the log server 4 (step S112).

Figure 19A:
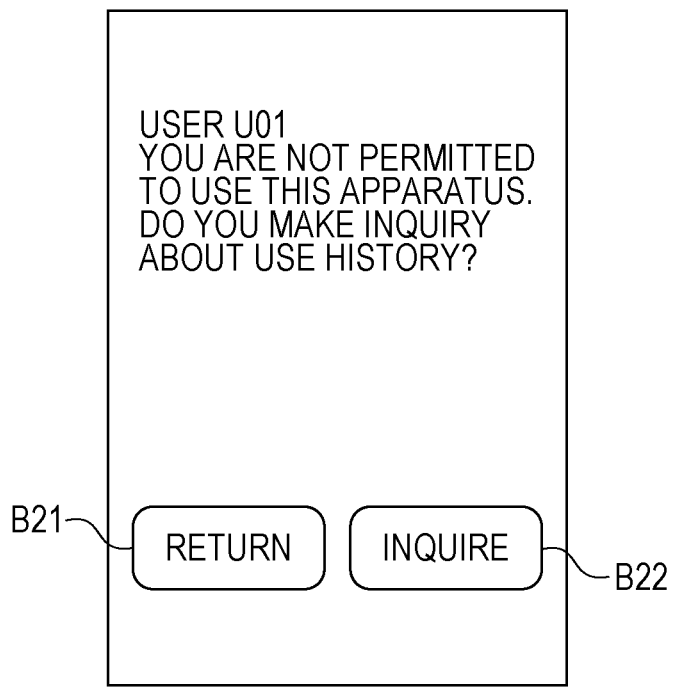
FIGS. 19A and 19B illustrate an example of display on the terminal that has received a prohibition notification.
Figure 19B:
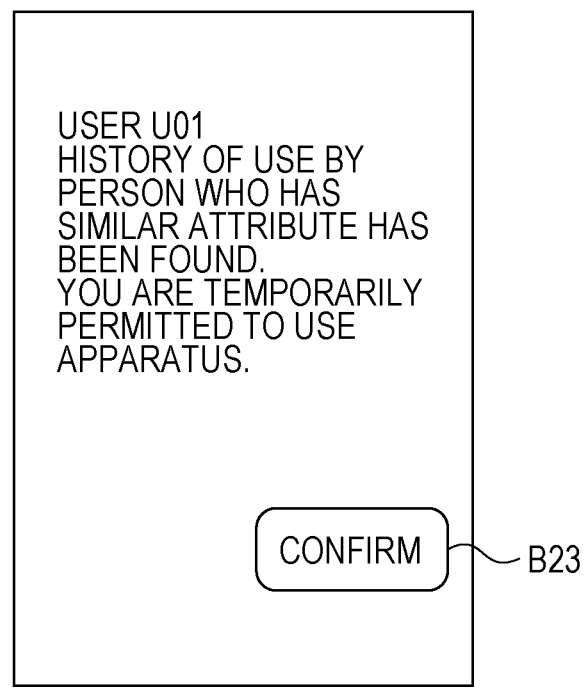

FIGS. 19A and 19B illustrate an example of display on the terminal 1 that has received the prohibition notification. As illustrated in FIG. 19A, the terminal 1 displays a message "YOU ARE NOT PERMITTED TO USE THIS APPARATUS. DO YOU MAKE INQUIRY ABOUT USE HISTORY?" for the first user identified by a user ID "U01". As illustrated in FIG. 19A, a button B21 having a character string "RETURN" and a button B22 having a character string "INQUIRE" are displayed below this message.

When the first user clicks the button B21, the terminal 1 causes, for example, the screen illustrated in FIG. 15B to be displayed again on the display unit 15. Meanwhile, when the first user clicks the button B22, the terminal 1 inquires of the log server 4 whether or not a second user has used the information processing apparatus 2 which the first user is prohibited from using (step S113). This second user is another user having an attribute that is in a predetermined relationship with an attribute of the first user, as described above.

A case where "two attributes are in a predetermined relationship" is, for example, a case where these attributes are identical to each other to a certain degree or larger, are similar to each other, or belong to the same group. In the following description, the second user is a user whose at least one of the occupation, the department, and the location is identical to that of the first user.

The log server 4 that has received the inquiry from the terminal 1 searches the use history DB 421 for a history of use of the designated information processing apparatus 2 by the second user designated by this inquiry (step S114).

In a case where this history is not found in the use history DB 421 as a result of the search, the log server 4 notifies the terminal 1 about this result. Meanwhile, in a case where this history is found in the use history DB 421, the log server 4 transmits second permission information to the terminal 1 (step S115). Upon receipt of the second permission information from the log server 4, the terminal 1 transmits the second permission information to the information processing apparatus 2 (step S116).

For example, in a case where the user ID of the first user is "U01", the terminal 1 acquires the first permission information P1 illustrated in FIG. 16 from the server 3. When the first user moves to a position in front of an information processing apparatus 2 identified by an apparatus ID "D12" and attempts to use this information processing apparatus 2 by operating the terminal 1, this information processing apparatus 2 receives the first permission information P1 from the terminal 1 and transmits a prohibition notification to the first user.

When the terminal 1 receives an operation for making an inquiry from the first user, the terminal 1, for example, extracts attribute information of the first user from the first permission information P1. Then, the terminal 1 transmits, to the log server 4, an inquiry designating the apparatus ID "D12" of the information processing apparatus 2 that has transmitted the prohibition notification and designating, as a second user, a user whose at least one of the extracted three pieces of attribute information is identical to that of the first user.

In this case, the inquiry transmitted to the log server 4 includes the occupation "developer", department "EDS", and location "YMM" illustrated in FIG. 16 as attribute information. Furthermore, the inquiry transmitted to the log server 4 includes the apparatus ID "D12" of the information processing apparatus 2.

In response to the inquiry received from the terminal 1, the log server 4 searches the use history DB 421 for a history indicating that a second user whose at least one of the pieces of attribute information is identical to that of the first person used the information processing apparatus 2 identified by the apparatus ID "D12".

In a case where the log server 4 searches the use history DB 421 illustrated in FIG. 6, a user identified by a user ID "U02" is one of second users since the location "YMM" of the user identified by the user ID "U02" is identical to that of the first user identified by the user ID "U01". Furthermore, the use history DB 421 illustrated in FIG. 6 has a history indicating that the second user identified by the user ID "U02" used the information processing apparatus 2 identified by the apparatus ID "D12".

Accordingly, in this case, the log server 4 finds this history from the use history DB 421 and transmits second permission information to the terminal 1.

Figure 20:
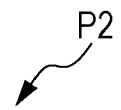
FIG. 20 illustrates a specific example of the second permission information.

FIG. 20 illustrates a specific example of second permission information. As illustrated in FIG. 20, the second permission information P2 is written, for example, in XML. In this case, for example, the apparatus ID of the information processing apparatus 2 which the first user is temporarily permitted to use is expressed by a start tag and an end tag of an element name "serial", and the apparatus ID "D12" is written between the start tag and the end tag. The second permission information illustrated in FIG. 20 indicates that a second user for the first user has used the information processing apparatus 2 identified by the apparatus ID "D12".

Note that the second permission information may include a signature of the log server 4. For example, the second permission information P2 includes a signature of the log server 4 written between a start tag and an end tag of an element name "signature", as illustrated in FIG. 20.

For example, this signature is generated by a secret key unique to the log server 4 and can be verified by a public key corresponding to this secret key. This signature may be generated by a shared key shared by the log server 4 and the information processing apparatus 2. In a case where the second permission information P2 includes this signature, the information processing apparatus 2 can verify that the second permission information P2 is legitimate second permission information issued by the log server 4.

The information processing apparatus 2 that has received the second permission information verifies the second permission information. In a case where the information processing apparatus 2 determines that temporary use of this information processing apparatus 2 is permitted, the information processing apparatus 2 transmits a temporary permission notification to the terminal 1 (step S117). The terminal 1 that has received the temporary permission notification causes a screen corresponding to the temporary permission notification to be displayed on the display unit 15. This screen is, for example, a screen illustrated in FIG. 19B. As illustrated in FIG. 19B, a message "HISTORY OF USE BY PERSON WHO HAS SIMILAR ATTRIBUTE HAS BEEN FOUND. YOU ARE TEMPORARILY PERMITTED TO USE APPARATUS." is displayed for the first user identified by the user ID "U01" on the terminal 1. When the first user who sees this message clicks a button B23 having a character string "CONFIRM", the terminal 1 displays a screen for accepting an operation for temporarily using the information processing apparatus 2.

Then, the terminal 1 transmits an update request to the server 3, for example, at a timing of start or end of the temporary use of the information processing apparatus 2 by the first user or at a timing of receipt of an instruction from the first user (step S118).

Upon receipt of the update request, the server 3 updates the permission information DB 322 by adding the apparatus ID of the information processing apparatus 2 which the first user has been temporarily permitted to use to the permission information DB 322 in association with the user ID of the first user (step S119). The permission information DB 322 thus updated indicates the information processing apparatus 2 which the first user has been temporarily permitted to use.

The temporary permission of use is given to the first user on the basis of the second permission information by the information processing apparatus 2. That is, this server 3 is an example of a server that updates first permission information in response to an update request from a first apparatus so that the first permission information indicates a second apparatus that has permitted use thereof on the basis of second permission information.

Although the terminal 1 transmits the update request to the server 3 at a predetermined timing after start of the temporary use of the information processing apparatus 2 by the first user in step S118, a timing of transmission of the update request is not limited to this. For example, the terminal 1 may transmit the update request to the server 3 before start of temporary use by the first user, as long as the update request is transmitted after receipt of the second permission information from the log server 4 in step S115.

Through the above operation, the information processing system 9 permits even a first user who is not permitted to use an information processing apparatus 2 to use the information processing apparatus 2 in a case where a second user having an attribute that is in a predetermined relationship with an attribute of the first user has been already permitted to use the information processing apparatus 2.

Modifications

The exemplary embodiment has been described above but can be modified as follows. The following modifications can be combined with each other.

<1>

Although the terminal 1, the information processing apparatus 2, the server 3, and the log server 4 include the processor 11, the processor 21, the processor 31, and the processor 41, which are CPUs, respectively in the above exemplary embodiment, controllers for controlling these apparatuses may be different from these processors. For example, these apparatuses may have various processors in addition to the CPUs.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

<2>

In the embodiment above, the term "processor" is broad enough to encompass one processor or plural processors in collaboration which are located physically apart from each other but may work cooperatively.

The order of operations of the processor is not limited to one described in the embodiment above, and may be changed.

<3>

Although the terminal 1 that has received second permission information from the log server 4 transmits the second permission information to an information processing apparatus 2 in the above exemplary embodiment, the terminal 1 may wait for an instruction from a third user who is an administrator of the information processing apparatus 2 indicated by the second permission information. In this case, the terminal 1 may transmit the second permission information to the information processing apparatus 2 after receipt of the instruction from the third user.

Figure 21:
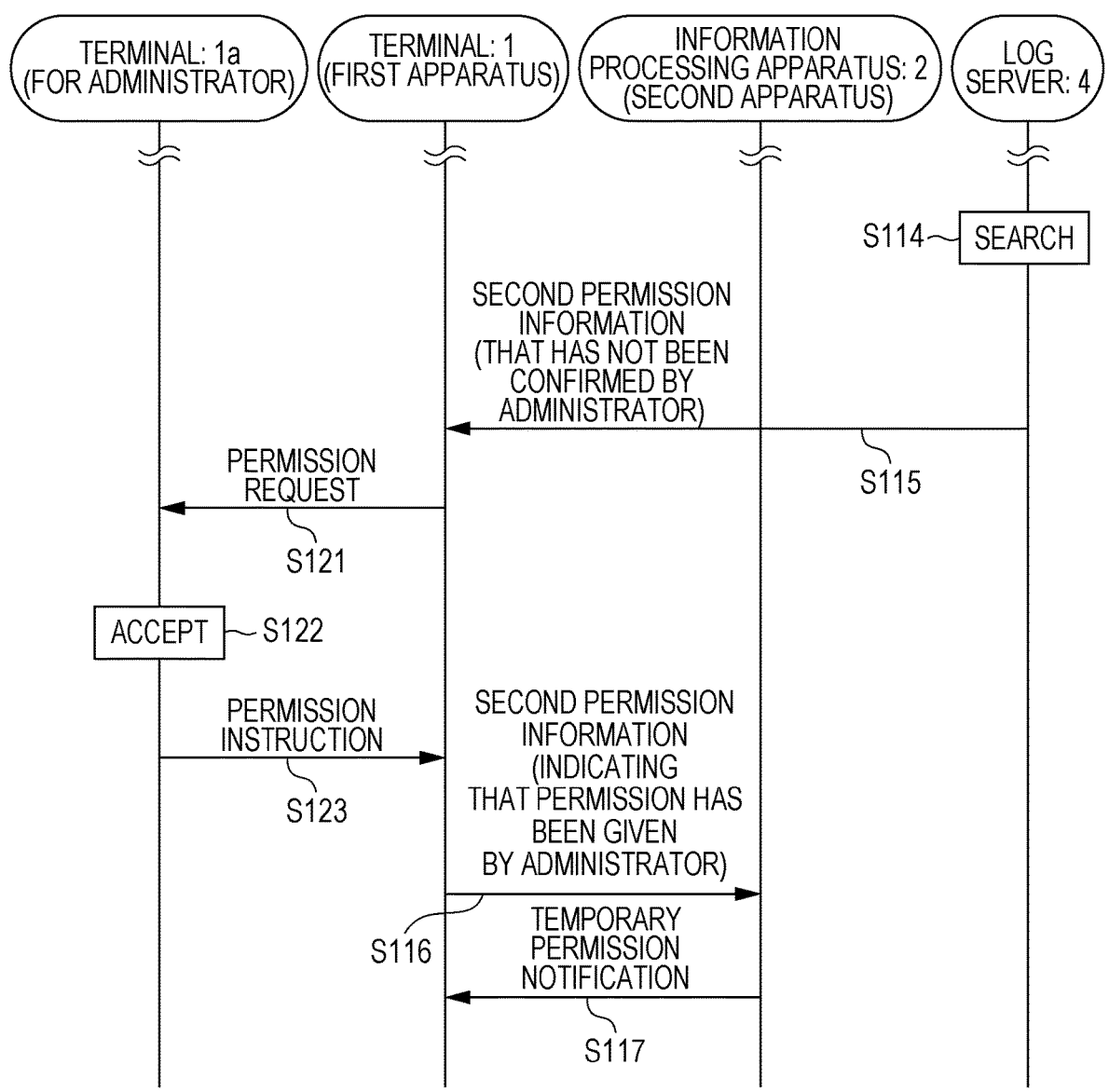
FIG. 21 is a sequence diagram illustrating an example of flow of operation for requesting permission of an administrator.

FIG. 21 is a sequence diagram illustrating an example of flow of operation for requesting permission from an administrator. The operation illustrated in FIG. 21 includes the steps to step S114 illustrated in FIG. 18.

In step S114, the log server 4 searches the use history DB 421 for a history of use of the designated information processing apparatus 2 by a second user. In a case where this history is not found from the use history DB 421 as a result of this search, the log server 4 notifies the terminal 1 about this result. Meanwhile, in a case where this history is found from the use history DB 421, the log server 4 transmits second permission information to the terminal 1 (step S115). This second permission information is information that has not been confirmed yet by a third user who is an administrator (hereinafter referred to as information that has not been confirmed by the administrator).

Upon receipt of the second permission information that has not been confirmed by the administrator from the log server 4, the terminal 1 requests the terminal 1a of the third user to give the first user permission to use the information processing apparatus 2 indicated by the second permission information (step S121) and waits for an instruction from the third user who is the administrator of the information processing apparatus 2 indicated by the second permission information.

Upon receipt of the request (hereinafter also referred to as a permission request) from the terminal 1 that has received the second permission information that has not been confirmed by the administrator, the terminal 1a shifts to a state for accepting an operation of the third user (step S122).

Figure 22A:
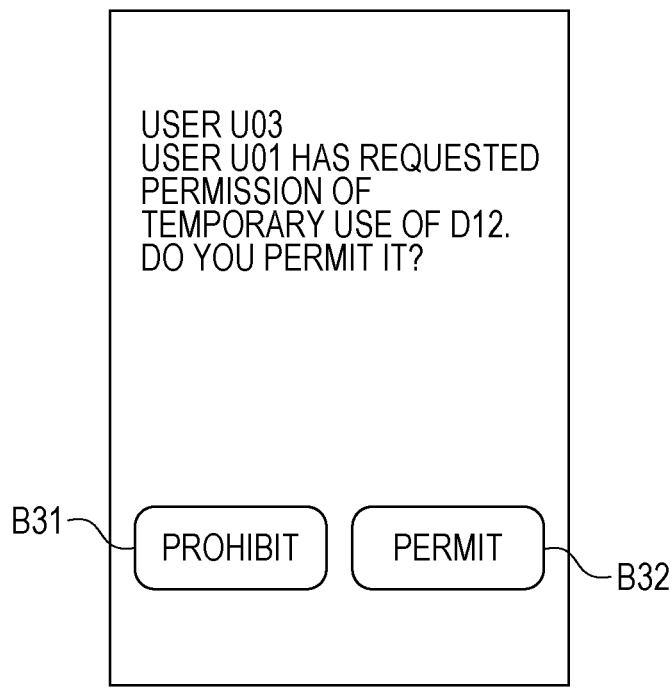
FIGS. 22A and 22B illustrate an example of the terminal that exchanges a permission request.
Figure 22B:
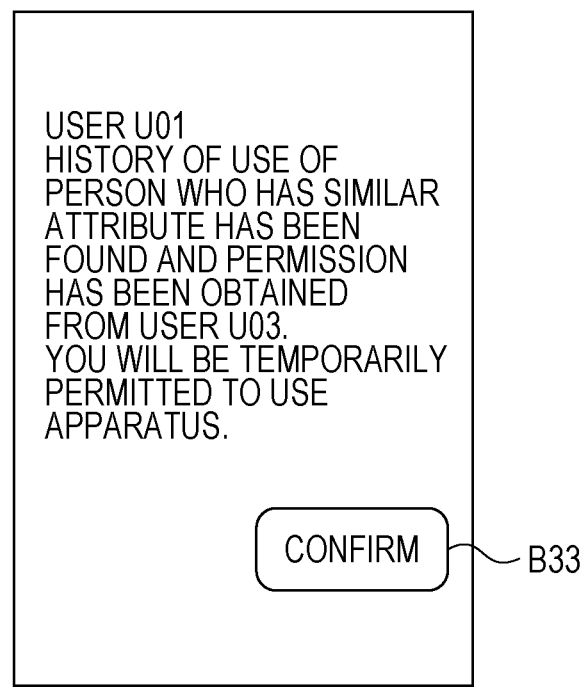

FIGS. 22A and 22B illustrate an example of the terminal 1 that exchanges the permission request. FIG. 22A illustrates an example of an operation screen displayed on the terminal 1a upon receipt of the permission request from the terminal 1. In this example, the terminal 1 that has transmitted the permission request is operated by the first user having a user ID "U01". Furthermore, in this example, the terminal 1a that has received the permission request is operated by the third user having a user ID "U03".

On the operation screen illustrated in FIG. 22A, a message "USER U01 HAS REQUESTED PERMISSION OF TEMPORARY USE OF D12. DO YOU PERMIT IT?" is displayed for the third user who operates the terminal 1a.

In a case where the third user who sees this message prohibits the first user from temporarily using the information processing apparatus 2 identified by the apparatus ID "D12", the third user, for example, clicks a button B31 having a character string "PROHIBIT" displayed below this message. Meanwhile, in a case where the third user permits the temporary use, the third user, for example, clicks a button B32 having a character string "PERMIT" displayed below the message.

When the third user gives an instruction (hereinafter also referred to as a permission instruction) to permit the first user to use the information processing apparatus 2 which the third user manages in response to the permission request, the terminal 1a receives this permission instruction and transmits the permission instruction to the terminal 1 (step S123), as illustrated in FIG. 21.

Note that step S121 of transmitting the permission request from the terminal 1 to the terminal 1a and step S123 for transmitting the permission instruction from the terminal 1a to the terminal 1 may be performed through the server 3. In this case, the server 3 need just authenticate the first user of the terminal 1 and the third user of the terminal 1a on the basis of their authentication information and permit exchange of a permission request or a permission instruction in accordance with an instruction from the first user or the third user.

The terminal 1 that has received the permission instruction generates second permission information indicating that the third user has given permission (hereinafter referred to as "permission has been given by the administrator") from the second permission information that has not been confirmed by the administrator on the basis of this permission instruction and transmits this second permission information to the information processing apparatus 2 (step S116).

Upon receipt of the second permission information from the terminal 1, the information processing apparatus 2 transmits, to the terminal 1, a temporary permission notification for temporarily permitting the first user to use the information processing apparatus 2 after confirming that this second permission information indicates that permission has been given by the administrator (step S117). For the information processing apparatus 2, the second permission information indicating that permission has been given by the administrator is information including the instruction from the third user who manages this information processing apparatus 2.

FIG. 22B illustrates an example of an operation screen displayed on the terminal 1 upon receipt of the temporary permission notification from the information processing apparatus 2. On this operation screen, a message "HISTORY OF USE OF PERSON WHO HAS SIMILAR ATTRIBUTE HAS BEEN FOUND AND PERMISSION HAS BEEN OBTAINED FROM USER U03. YOU WILL BE TEMPORARILY PERMITTED TO USE APPARATUS." is displayed for the first user who operates the terminal 1.

The first user who has confirmed this message clicks a button B33 having a character string "CONFIRM" displayed below the message. This allows the first user to start temporary use of the information processing apparatus 2 that has transmitted the temporary permission notification.

That is, the processor 21 of the information processing apparatus 2 is an example of a processor that shifts to a state for accepting an instruction from a third user who manages this information processing apparatus 2 in a case where first permission information indicates this information processing apparatus 2 and a second user has been permitted to use this information processing apparatus 2 and permits a first user to use this information processing apparatus 2 upon receipt of an instruction from the third user to give the first user permission to use this information processing apparatus 2.

According to this configuration, it is not until permission is obtained from the third user who manages the information processing apparatus 2 that the information processing apparatus 2 can permit the first user to use this information processing apparatus 2, even in a case where there is a history of use of this information processing apparatus 2 by a second user having an attribute that is in a predetermined relationship with an attribute of the first user. This improves security of the information processing apparatus 2 as compared with a case where permission from the third user is not asked for.

<4>

Although the log server 4 receives a storing command from a terminal 1 when the terminal 1 uses the information processing apparatus 2 on the basis of first permission information in the above exemplary embodiment, an apparatus that transmits the storing command is not limited to the terminal 1. For example, an information processing apparatus that has given permission to the terminal 1 on the basis of first permission information may issue a storing command. In this case, this information processing apparatus may be communicably connected to the log server 4.

Figure 23:
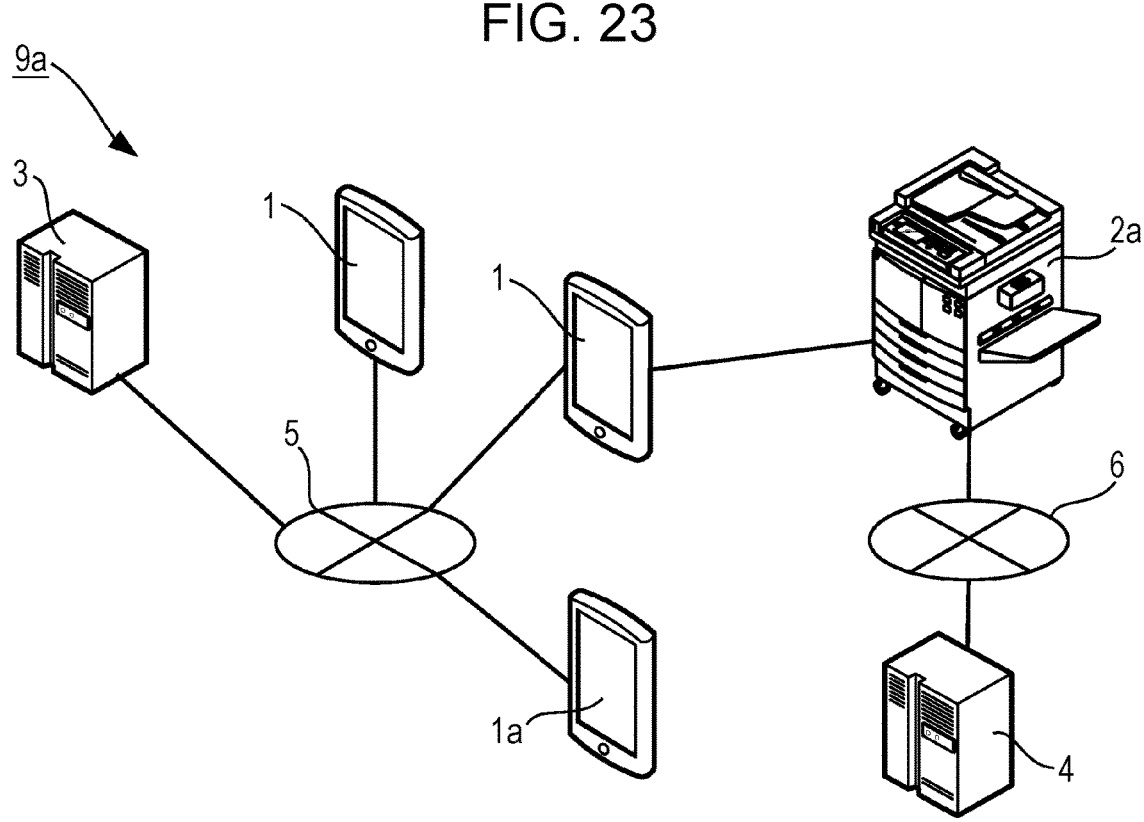
FIG. 23 illustrates an example of an overall configuration of an information processing system according to a modification.

FIG. 23 illustrates an example of an overall configuration of an information processing system 9a according to a modification. The information processing system 9a illustrated in FIG. 23 includes an information processing apparatus 2a instead of the information processing apparatuses 2 illustrated in FIG. 1 and includes a communication line 6. Furthermore, the log server 4 is connected to the communication line 6.

The communication line 6 is a wired or wireless line that communicably connects the information processing apparatus 2a and the log server 4. The communication line 6 is, for example, a LAN in a company, an organization, or the like and is a dedicated line that connects plural information processing apparatuses 2.

Figure 24:
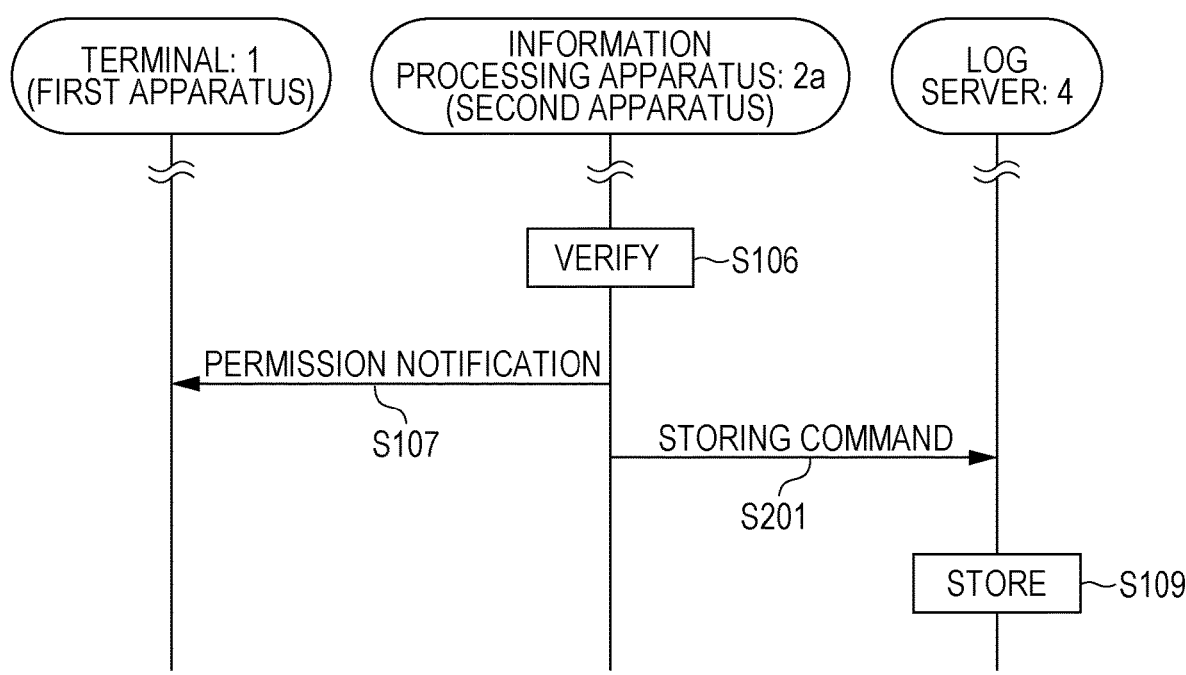
FIG. 24 is a sequence diagram illustrating an example of flow of transmission of a permission notification by the information processing apparatus.

FIG. 24 is a sequence diagram illustrating an example of flow of transmission of a permission notification by the information processing apparatus 2a. The operation illustrated in FIG. 24 includes the steps illustrated in FIG. 13 excluding step S108.

The information processing apparatus 2a verifies whether or not the first user is permitted to use the information processing apparatus 2a on the basis of the first permission information received from the terminal 1 (step S106) and, in a case where this verification succeeds, the information processing apparatus 2a transmits a permission notification to the terminal 1 (step S107). Furthermore, the information processing apparatus 2a transmits a storing command to the log server 4 through the communication line 6 after succeeding in the verification (step S201).

The log server 4 that has received this storing command stores therein a user ID of the first user and an apparatus ID of the information processing apparatus 2a which the first user used on the basis of the first permission information (step S109). In this modification, an order of execution of step S107 and step S201 is not limited to the order described above and can be reversed.

Figure 25:
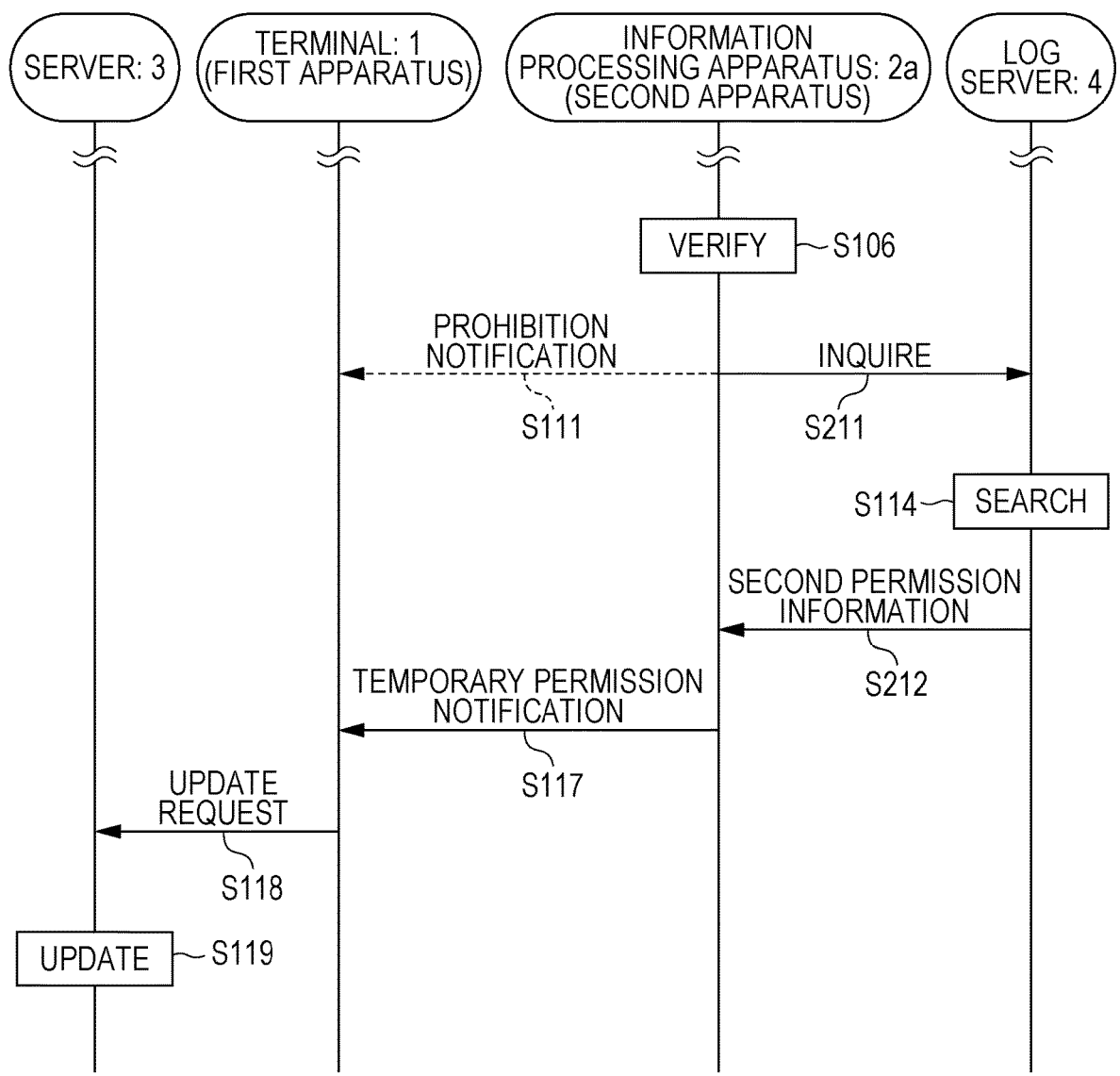
FIG. 25 is a sequence diagram illustrating an example of flow of transmission of a temporary permission notification by the information processing apparatus.

FIG. 25 is a sequence diagram illustrating an example of flow of transmission of a temporary permission notification by the information processing apparatus 2a. The operation illustrated in FIG. 25 includes the steps to step S106 and the steps from step S117 illustrated in FIG. 18.

In a case where the verification fails in step S106, the information processing apparatus 2a inquires of the log server 4 whether or not a second user has used this information processing apparatus 2a (step S211). In this case, the information processing apparatus 2a may transmit a prohibition notification to the terminal 1 (step S111) but may omit transmission of a prohibition notification to the terminal 1.

Upon receipt of the inquiry from the information processing apparatus 2a, the log server 4 searches the use history DB 421 for a history indicating that a second user has used the information processing apparatus 2a that has made the inquiry (step S114). In a case where this history is found from the use history DB 421, the log server 4 transmits second permission information to the information processing apparatus 2a (step S212).

The information processing apparatus 2a that has received this second permission information transmits a temporary permission notification to the terminal 1 (step S117), and the terminal 1 that has received the temporary permission notification transmits an update request to the server 3 (step S118). Then, the server 3 updates the permission information DB 322 in response to the received update request (step S119).

According to this configuration, the terminal 1 that has received a permission notification from the information processing apparatus 2a need not transmit a storing command to the log server 4. Furthermore, in a case where the information processing apparatus 2a does not permit use thereof on the basis of the first permission information transmitted by the terminal 1, the terminal 1 need not transmit the inquiry to the log server 4.

<5>

In the above modification, the storing command transmitted to the log server 4 by the information processing apparatus 2a may include attribute information of the first user. In this case, the log server 4 that has received this storing command need just store therein the attribute information included in the storing command in association with the user ID of the first user and the apparatus ID of the information processing apparatus 2a.

That is, the processor 21 of the information processing apparatus 2a is an example of a processor that acquires attribute information indicative of an attribute of the first user and, in a case where first permission information indicates this information processing apparatus 2a, permits the first user to use this information processing apparatus 2a and causes the attribute information of the first user to be stored in the log server.

Furthermore, this information processing apparatus 2a is an example of a second apparatus that, in a case where received first permission information indicates this information processing apparatus 2a, permits the first user to use this information processing apparatus 2a and transmits attribute information of the first user to the log server.

Although the information processing apparatus 2a inquires of the log server 4 whether or not a second user has used this information processing apparatus 2a in a case where the verification fails in the above modification, the information processing apparatus 2a may inquire of the log server 4 whether or not attribute information of the second user is stored in a case where the storing command includes attribute information. In this case, in a case where it is determined that the attribute information of the second user is stored, the log server 4 transmits second permission information to the information processing apparatus 2a, and the information processing apparatus 2a that has received this second permission information transmits a temporary permission notification to the terminal 1.

That is, the processor 21 of the information processing apparatus 2a is an example of a processor that inquires of a log server whether or not attribute information of a second user is stored in a case where first permission information does not indicate this information processing apparatus 2a and permits a first user to use this information processing apparatus 2a in a case where second permission information indicating that the attribute information of the second user is stored is received from the log server.

Furthermore, this information processing apparatus 2a is an example of a second apparatus that inquires of a log server whether or not attribute information of a second user is stored in a case where received first permission information does not indicate this information processing apparatus 2a and, in a case where second permission information is received from the log server, permits a first user to use this information processing apparatus 2a.

<6>

Although the information processing apparatus 2a is connected to the log server 4, which is an external apparatus, through the communication line 6 in the above modification, the information processing apparatus 2a may have a function of the log server 4. In this case, the information processing apparatus 2a need just store a use history in the memory 22 thereof without transmitting a storing command to the log server 4. Furthermore, in this case, the information processing apparatus 2a need just search the use history stored in the memory 22 of this information processing apparatus 2a for a history of use by the second user without transmitting an inquiry to the log server 4.

<7>

Although the information processing apparatus 2a transmits a temporary permission notification to the terminal 1 upon receipt of second permission information that is transmitted from the log server 4 in response to the inquiry in the above modification, the information processing apparatus 2a may transmit a temporary permission notification after receiving an instruction from a third user who is an administrator of the information processing apparatus 2a.

Figure 26:
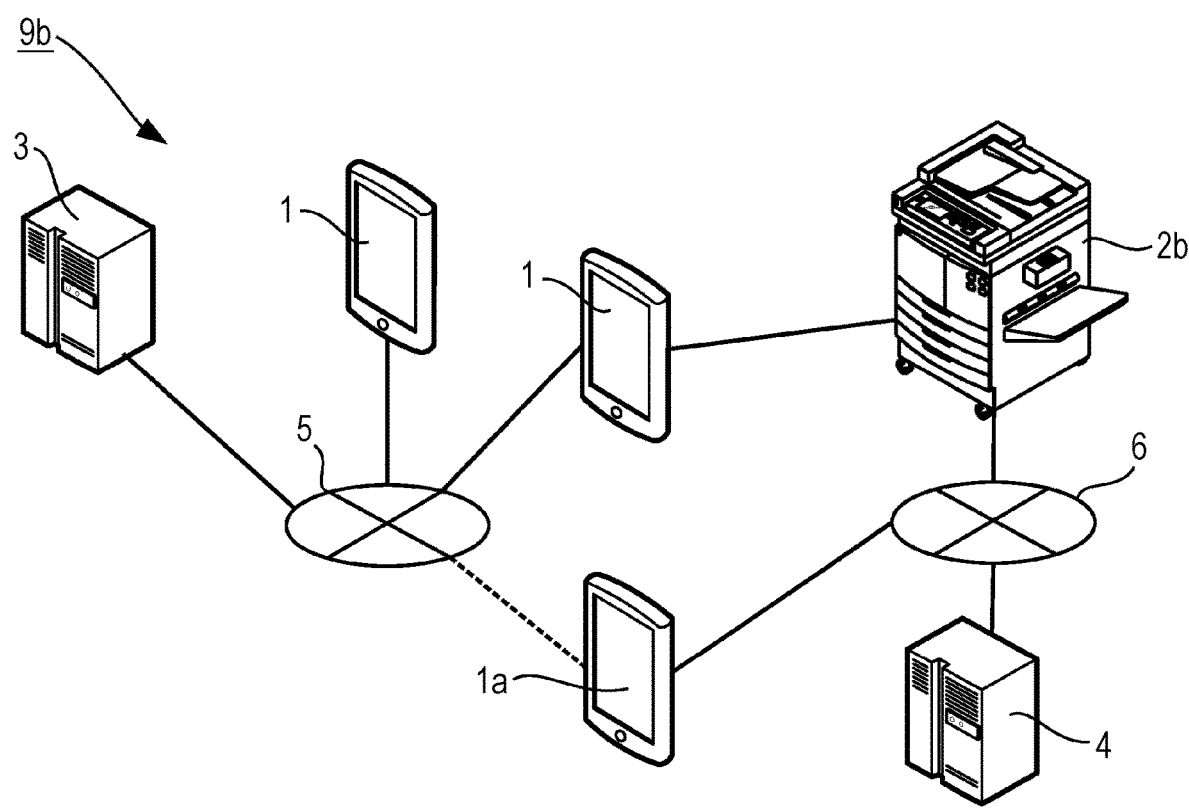
FIG. 26 illustrates an example of an overall configuration of an information processing system according to a modification.

FIG. 26 illustrates an example of an overall configuration of an information processing system 9b according to a modification. The information processing system 9b illustrated in FIG. 26 includes an information processing apparatus 2b instead of the information processing apparatus 2a illustrated in FIG. 23, and the terminal 1a is communicably connected to the information processing apparatus 2b through the communication line 6.

Figure 27:
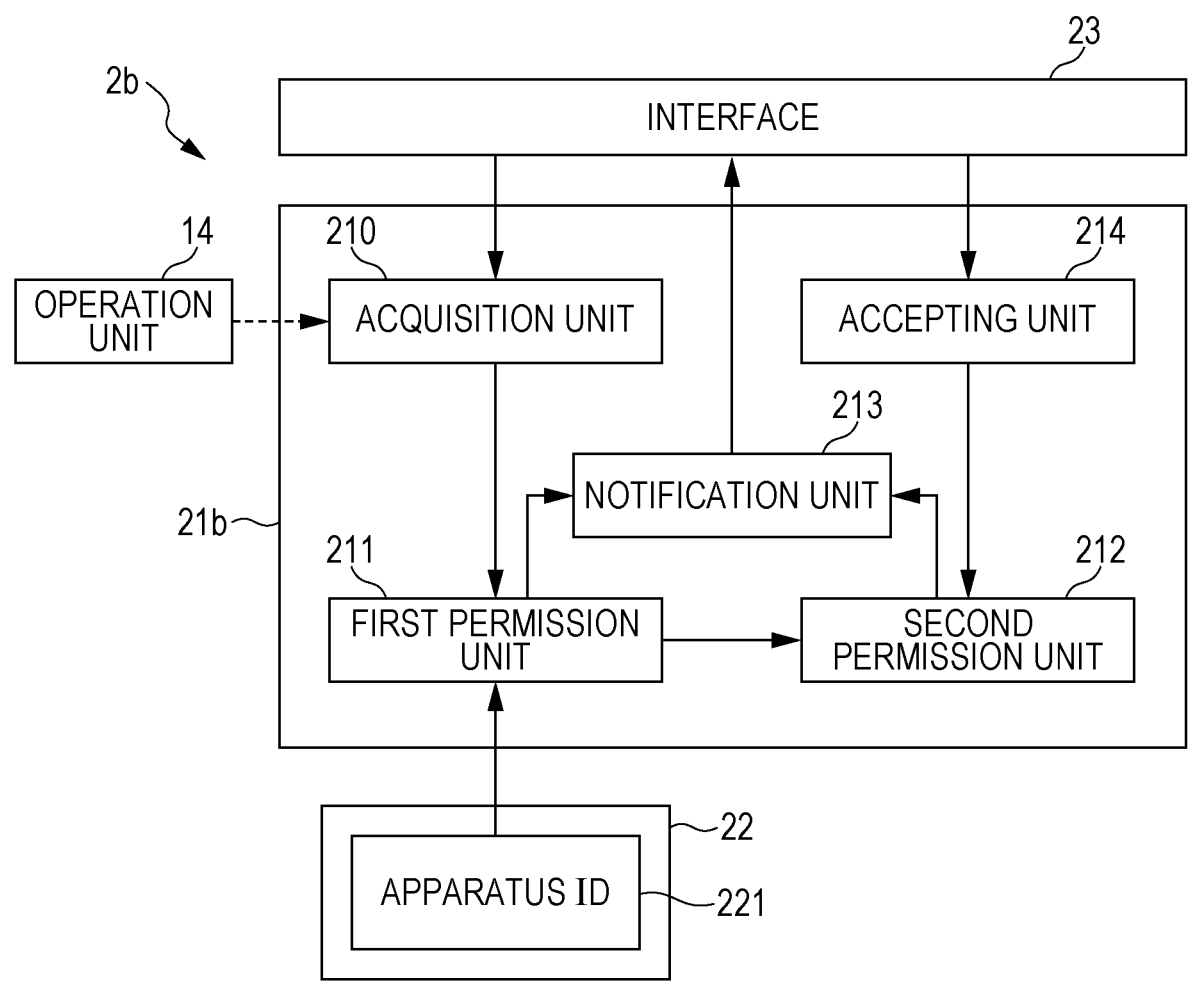
FIG. 27 illustrates an example of a functional configuration of an information processing apparatus according to a modification.

FIG. 27 illustrates an example of a functional configuration of the information processing apparatus 2b according to the modification. The information processing apparatus 2b includes a processor 21b instead of the processor 21 illustrated in FIG. 12. The processor 21b functions as an accepting unit 214 in addition to the acquisition unit 210, the first permission unit 211, the second permission unit 212, and the notification unit 213 realized by the processor 21 illustrated in FIG. 12.

The second permission unit 212 illustrated in FIG. 27 receives second permission information from the acquisition unit 210 through the first permission unit 211. This second permission information is second permission information that has not been confirmed by the administrator since permission has not been obtained from the third user. Upon receipt of this second permission information that has not been confirmed by the administrator, the second permission unit 212 generates a permission request for the third user who is the administrator of the information processing apparatus 2b. The notification unit 213 transmits the permission request generated by the second permission unit 212 to the terminal 1a operated by the third user.

The accepting unit 214 receives, from the terminal 1a, a permission instruction given by the third user in response to the permission request. Upon receipt of the permission instruction by the accepting unit 214, the second permission unit 212 issues a temporary permission notification for the first user. The notification unit 213 transmits the temporary permission notification issued by the second permission unit 212 to the terminal 1.

Figure 28:
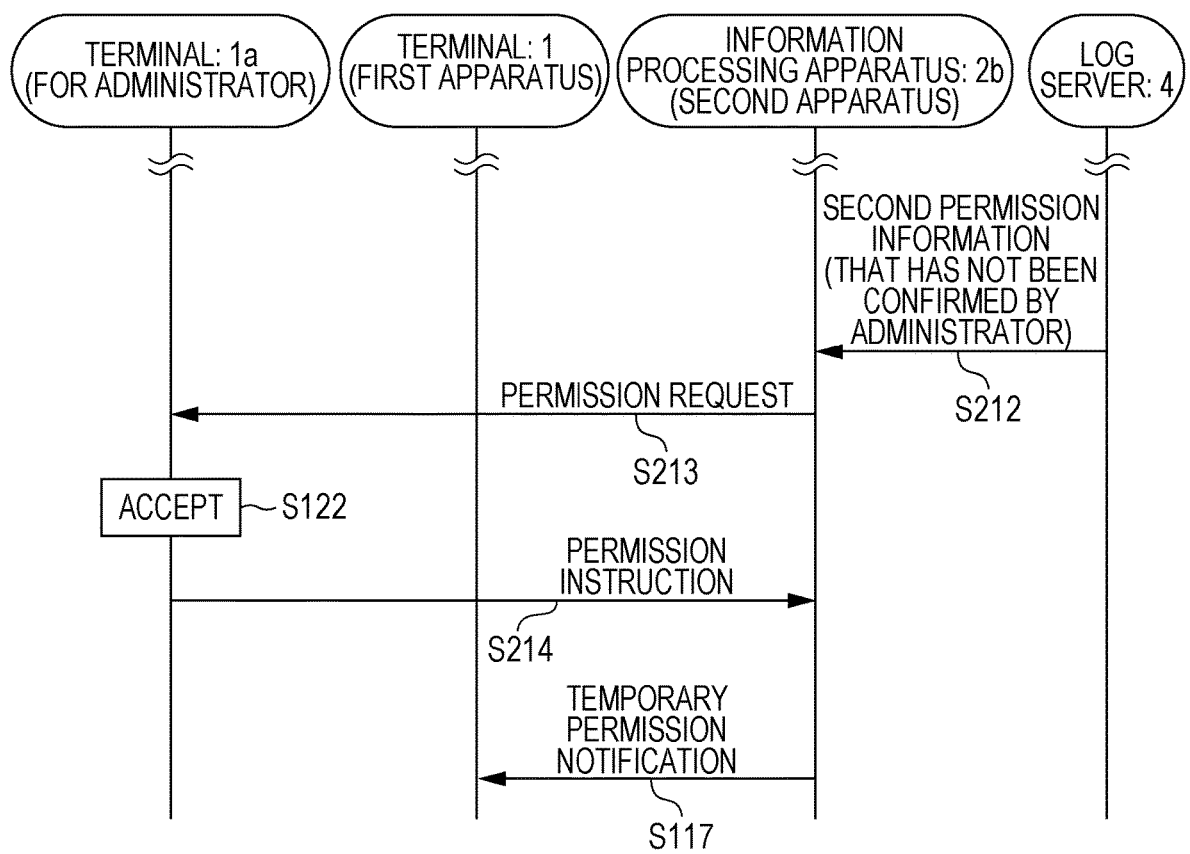
FIG. 28 is a sequence diagram illustrating an example of flow of transmission of a prohibition notification by the information processing apparatus.

FIG. 28 is a sequence diagram illustrating an example of flow of transmission of a prohibition notification by the information processing apparatus 2b. The operation illustrated in FIG. 28 includes steps to step S212 and steps from step S117 illustrated in FIG. 25.

In step S212 illustrated in FIG. 28, the log server 4 transmits second permission information that has not been confirmed by the administrator to the information processing apparatus 2b. Upon receipt of this second permission information that has not been confirmed by the administrator, the information processing apparatus 2b transmits a permission request to the terminal 1a of the third user through the communication line 6 (step S213). This permission request is a request for requesting the third user to permit the first user to use the information processing apparatus 2b.

Upon receipt of the permission request from the information processing apparatus 2b, the terminal 1a shifts to a state for accepting an operation of the third user (step S122). When the third user gives a permission instruction to permit the first user to use the information processing apparatus 2b, the terminal 1a transmits this permission instruction to the information processing apparatus 2b (step S214), as illustrated in FIG. 28. Upon receipt of the permission instruction from the terminal 1a, the information processing apparatus 2b transmits a temporary permission notification for temporarily permitting the first user to use the information processing apparatus 2b to the terminal 1 (step S117).

This configuration also improves security of the information processing apparatus 2b as compared with a case where permission of the third user is not asked for.

<8>

Although the terminal 1 gives a storing command including attribute information of the first user to the log server 4 in the above exemplary embodiment, this storing command need not include the attribute information.

Figure 29:
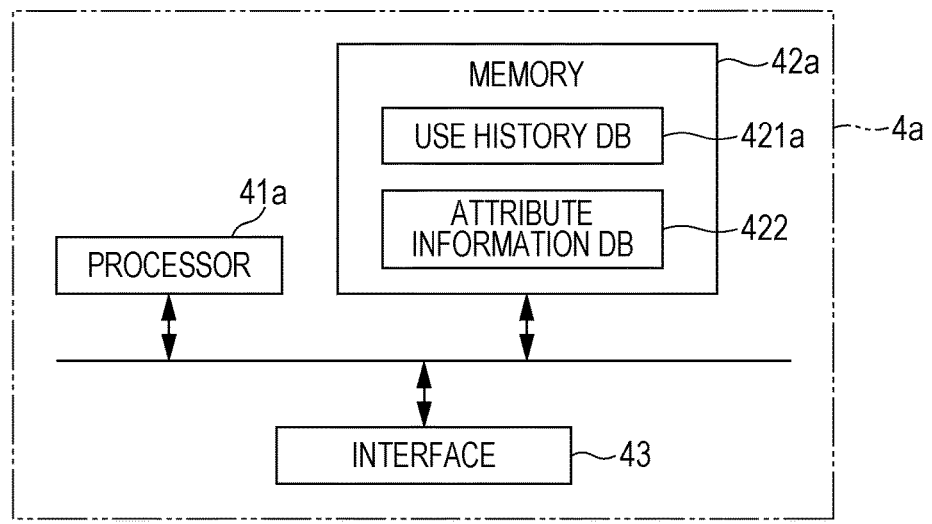
FIG. 29 illustrates an example of a configuration of a log server.

FIG. 29 illustrates an example of a configuration of a log server 4a. The log server 4a illustrated in FIG. 29 includes a processor 41a instead of the processor 41 illustrated in FIG. 5 and includes a memory 42a instead of the memory 42. The memory 42a includes a use history DB 421a instead of the use history DB 421 illustrated in FIG. 5 and includes an attribute information DB 422. This is a difference from the memory 42 illustrated in FIG. 5.

FIGS. 30A and 30B illustrate an example of a database stored in the memory 42a. FIG. 30A illustrates an example of the attribute information DB 422. This attribute information DB 422 is a database in which correspondences between user IDs and attribute information of users identified by the user IDs are stored.

FIG. 30B illustrates an example of the use history DB 421a. The use history DB 421a has "time and date", "user ID", and "apparatus ID" of the use history DB 421 illustrated in FIG. 6 but does not have "occupation", "department", and "location".

Figure 31:
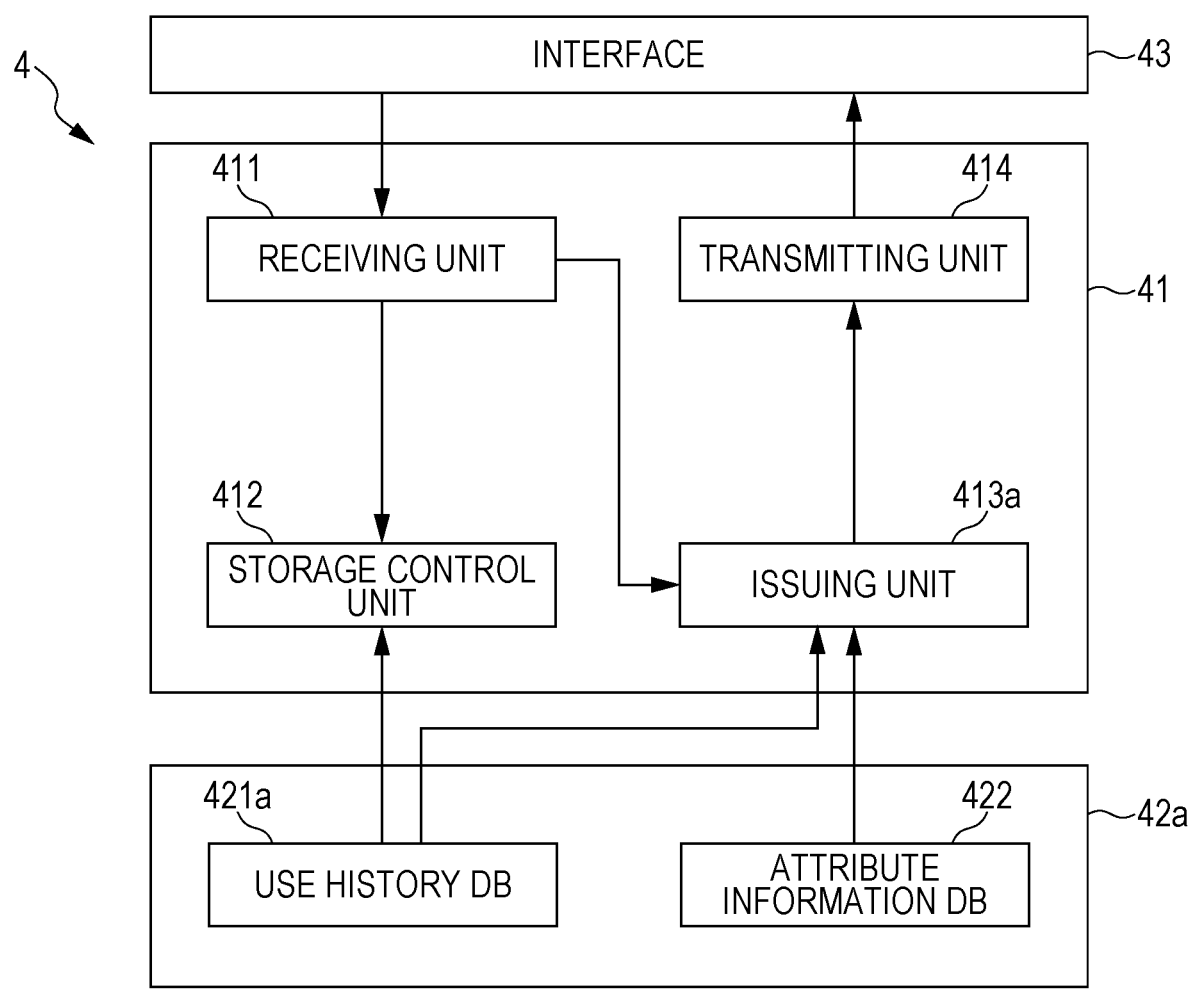
FIG. 31 illustrates an example of a functional configuration of the log server.

FIG. 31 illustrates an example of a functional configuration of the log server 4a. The processor 41a illustrated in FIG. 31 is different from the processor 41 illustrated in FIG. 10 in that the processor 41a includes an issuing unit 413a instead of the issuing unit 413.

The receiving unit 411 receives a user ID of a user, an apparatus ID of an information processing apparatus 2 used by this user, and time and date information indicative of time and date of the use through the interface 43. Then, the storage control unit 412 causes the user ID, the apparatus ID, and the time and date information received by the receiving unit 411 to be stored in the use history DB 421a of the memory 42a. Since the receiving unit 411 does not receive attribute information of the user, the attribute information is not stored in the use history DB 421a.

Meanwhile, the receiving unit 411 receives an inquiry about whether or not there is a history indicating that a second user having an attribute that is in a predetermined relationship with an attribute of the first user used an information processing apparatus 2 which the first user is prohibited from using. This inquiry is, for example, transmitted from the terminal 1 operated by the first user and includes the user ID of the first user and the apparatus ID of the information processing apparatus 2 which the first user is prohibited from using.

When the receiving unit 411 receives this inquiry, the issuing unit 413a searches the attribute information DB 422 for the user ID of the first user included in this inquiry and specifies attribute information of the first user. Then, the issuing unit 413a extracts, from the attribute information DB 422, a user (i.e., a second user) having attribute information that is in a predetermined relationship with the specified attribute information on the basis of the specified attribute information.

For example, in a case where the inquiry includes a user ID "U01" of a first user and an apparatus ID "D12", the issuing unit 413a specifies an occupation "developer", a department "EDS", and a location "YMM" as attribute information of the first user by searching the attribute information DB 422 illustrated in FIG. 30A. Then, the issuing unit 413a extracts a user having at least one of these pieces of attribute information from the attribute information DB 422. In this example, a location of a user identified by a user ID "U02" is "YMM", which is identical to the location of the first user. Accordingly, this user is a candidate of the second user. Plural candidates of the second user may be extracted.

The issuing unit 413a determines whether or not user IDs of the extracted candidates of the second user are stored in the use history DB 421a. For example, a history indicating that a user identified by the user ID "U02" used the information processing apparatus 2 identified by the apparatus ID "D12" is stored in the use history DB 421a illustrated in FIG. 30B. Accordingly, the issuing unit 413a finds a history indicated by the inquiry when referring to the use history DB 421a illustrated in FIG. 30B. Then, the issuing unit 413a issues second permission information indicating that a second user is permitted to use the information processing apparatus 2 identified by the apparatus ID "D12". The transmitting unit 414 transmits, through the interface 43, the second permission information issued by the issuing unit 413a to the terminal 1 which made the inquiry.

The processor 41a may cause a history of issuance of second permission information to be stored in the memory 42a every time the second permission information is issued by the issuing unit 413a or every time the second permission information is transmitted by the transmitting unit 414. This history includes, for example, time and date of the issuance, contents of the issued second permission information, and contents of the inquiry. This history may be, for example, offered to a third user who is an administrator of the information processing apparatus 2 indicated by the second permission information so that the third user can view the history.

<9>

In the above exemplary embodiment, a program executed by the processor 31 of the server 3 is an example of a program for causing a computer having a processor to execute a step of acquiring first permission information indicative of an apparatus which a first user is permitted to use, a step of permitting the first user to use an information processing apparatus in a case where the first permission information indicates the information processing apparatus, and a step of permitting the first user to use the information processing apparatus in a case where the first permission information does not indicate the information processing apparatus and a second user having an attribute that is in a predetermined relationship with an attribute of the first user is permitted to use the information processing apparatus.

The program may be offered while being recorded in a computer-readable recording medium such as a magnetic recording medium (e.g., a magnetic tape or a magnetic disk), an optical recording medium (e.g., an optical disk), a magnetooptical medium, or a semiconductor memory. Alternatively, the program may be downloaded over a communication line such as the Internet.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising
a processor configured to:
  acquire first permission information indicative of an apparatus which a first user is permitted to use,
  permit the first user to use the information processing apparatus in a case where the first permission information indicates the information processing apparatus,
  permit the first user to use the information processing apparatus in a case where the first permission information does not indicate the information processing apparatus and a second user having an attribute that is in a predetermined relationship with an attribute of the first user is permitted to use the information processing apparatus,
  acquire attribute information indicative of the attribute of the first user,
  permit the first user to use the information processing apparatus and cause the attribute information of the first user to be stored in a log server in a case where the first permission information indicates the information processing apparatus, inquire of the log server whether or not attribute information of the second user is stored in a case where the first permission information does not indicate the information processing apparatus, and permit the first user to use the information processing apparatus in a case where second permission information indicating that the attribute information of the second user is stored is received from the log server.

2. The information processing apparatus according to claim 1, wherein the processor is configured to:

acquire the first permission information from a terminal operated by the first user, notify the terminal about permission of use of the information processing apparatus by the first user in a case where the first permission information indicates the information processing apparatus, notify the terminal about prohibition of use of the information processing apparatus by the first user in a case where the first permission information does not indicate the information processing apparatus, and notify the terminal about permission of the use in a case where second permission information indicating that the second user is permitted to use the information processing apparatus is received from the terminal notified about the prohibition of the use.

3. The information processing apparatus according to claim 2, wherein the processor is configured to:

acquire the first permission information indicative of an apparatus that permits the first user to use a first function thereof, permit the first user to use the first function of the information processing apparatus in a case where the first permission information indicates the information processing apparatus, and permit the first user to use a second function of the information processing apparatus that is restricted more than the first function in a case where the first permission information does not indicate the information processing apparatus and the second user is permitted to use the first function of the information processing apparatus.

4. The information processing apparatus according to claim 3, wherein the processor is configured to:

shift to a state for accepting an instruction from a third user who manages the information processing apparatus in a case where the first permission information does not indicate the information processing apparatus and the second user is permitted to use the information processing apparatus, and permit the first user to use the information processing apparatus in a case where an instruction to permit the first user to use the information processing apparatus is received from the third user.

5. The information processing apparatus according to claim 2, wherein the processor is configured to:

shift to a state for accepting an instruction from a third user who manages the information processing apparatus in a case where the first permission information does not indicate the information processing apparatus and the second user is permitted to use the information processing apparatus, and permit the first user to use the information processing apparatus in a case where an instruction to permit the first user to use the information processing apparatus is received from the third user.

6. The information processing apparatus according to claim 1, wherein the processor is configured to:

acquire the first permission info illation indicative of an apparatus that permits the first user to use a first function thereof, permit the first user to use the first function of the information processing apparatus in a case where the first permission information indicates the information processing apparatus, and permit the first user to use a second function of the information processing apparatus that is restricted more than the first function in a case where the first permission information does not indicate the information processing apparatus and the second user is permitted to use the first function of the information processing apparatus.

7. The information processing apparatus according to claim 6, wherein the processor is configured to:

shift to a state for accepting an instruction from a third user who manages the information processing apparatus in a case where the first permission information does not indicate the information processing apparatus and the second user is permitted to use the information processing apparatus, and permit the first user to use the information processing apparatus in a case where an instruction to permit the first user to use the information processing apparatus is received from the third user.

8. The information processing apparatus according to claim 1, wherein the processor is configured to:

shift to a state for accepting an instruction from a third user who manages the information processing apparatus in a case where the first permission information does not indicate the information processing apparatus and the second user is permitted to use the information processing apparatus, and permit the first user to use the information processing apparatus in a case where an instruction to permit the first user to use the information processing apparatus is received from the third user.

9. An information processing system comprising:

a first apparatus;

a log server;

a plurality of second apparatuses; and a server, wherein the first apparatus receives authentication information of a first user and transmits the authentication information to the server, the server transmits, to the first apparatus, first permission information indicative of a second apparatus which the first user is permitted to use among the plurality of second apparatuses in a case where the first user is authenticated on a basis of the authentication information, the first apparatus transmits the first permission information to a second apparatus selected from among the plurality of second apparatuses, and the selected second apparatus that has received the first permission information permits the first user to use the selected second apparatus in a case where the first permission information indicates the selected second apparatus and permits the first user to use the selected second apparatus in a case where the first permission information does not indicate the selected second apparatus and a second user having an attribute that is in a predetermined relationship with an attribute of the first user is permitted to use the selected second apparatus, wherein the log server stores therein received attribute information of a user who has been permitted to use any of the plurality of second apparatuses, and transmits second permission information for the first user to the first apparatus in a case where attribute information of the second user is stored in the log server when the log server receives an inquiry about whether or not the attribute information of the second user is stored in the log server, and the selected second apparatus permits the first user to use the selected second apparatus in a case where the second permission information is received from the first apparatus.

10. The information processing system according to claim 9 wherein the selected second apparatus inquires of the log server whether or not the attribute information of the second user is stored in the log server in a case where the received first permission information does not indicate the selected second apparatus and permits the first user to use the selected second apparatus in a case where the second permission information is received from the log server.

11. The information processing system according to claim 10, wherein the selected second apparatus permits the first user to use the selected second apparatus and transmits the attribute information of the first user to the log server in a case where the received first permission information indicates the second selected apparatus.

12. The information processing system according to claim 10, wherein the first apparatus requests the server to update the first permission information in a case where the first apparatus receives the second permission information from the log server; and upon receipt of the request to update the first permission information from the first apparatus, the server updates the first permission information so that the updated first permission information indicates the second apparatus which the first user is permitted to use on a basis of the second permission information.

13. The information processing system according to claim 9, wherein the selected second apparatus permits the first user to use the selected second apparatus and transmits the attribute information of the first user to the log server in a case where the received first permission information indicates the second selected apparatus.

14. The information processing system according to claim 9, wherein the first apparatus requests the server to update the first permission information in a case where the first apparatus receives the second permission information from the log server; and upon receipt of the request to update the first permission information from the first apparatus, the server updates the first permission information so that the updated first permission information indicates the second apparatus which the first user is permitted to use on a basis of the second permission information.

15. A non-transitory computer readable medium storing a program causing a computer that has a processor to execute a process for information processing, the process comprising:

acquiring first permission information indicative of an apparatus which a first user is permitted to use, permitting the first user to use the apparatus in a case where the first permission information indicates the apparatus, permitting the first user to use the apparatus in a case where the first permission information does not indicate the apparatus and a second user having an attribute that is in a predetermined relationship with an attribute of the first user is permitted to use the apparatus, acquiring attribute information indicative of the attribute of the first user, permitting the first user to use the information processing apparatus and cause the attribute information of the first user to be stored in a log server in a case where the first permission information indicates the information processing apparatus, inquiring of the log server whether or not attribute information of the second user is stored in a case where the first permission information does not indicate the information processing apparatus, and permitting the first user to use the information processing apparatus in a case where second permission information indicating that the attribute information of the second user is stored is received from the log server.

* * * * *